US012696358B2

(12) United States Patent
Lazor

(10) Patent No.: US 12,696,358 B2
(45) Date of Patent: Jul. 28, 2026

(54) TRANSVERSE FLUX INDUCTION HEATING DEVICE FOR HEATING FLAT PRODUCT

(71) Applicant: Ajax Tocco Magnethermic Corporation, Warren, OH (US)

(72) Inventor: David Lazor, Warren, OH (US)

(73) Assignee: Ajax Tocco Magnethermic Corporation, Warren, OH (US)

(*) Notice: Subject to any disclaimer, the term of this patent is extended or adjusted under 35 U.S.C. 154(b) by 0 days.

(21) Appl. No.: 18/001,554

(22) PCT Filed: Jun. 25, 2021

(86) PCT No.: PCT/US2021/039095
§ 371 (c)(1),
(2) Date: Dec. 12, 2022

(87) PCT Pub. No.: WO2021/263107
PCT Pub. Date: Dec. 30, 2021

(65) Prior Publication Data

US 2023/0232506 A1 Jul. 20, 2023

Related U.S. Application Data

(60) Provisional application No. 63/045,000, filed on Jun. 26, 2020.

(51) Int. Cl.
*H05B 6/10* (2006.01)
*H05B 6/36* (2006.01)
*H05B 6/44* (2006.01)

(52) U.S. Cl.
CPC ............ *H05B 6/101* (2013.01); *H05B 6/362* (2013.01); *H05B 6/44* (2013.01)

(58) Field of Classification Search
CPC ... C21D 1/42; C21D 9/46; C21D 1/10; H05B 6/02; H05B 6/10; H05B 6/101;
(Continued)

(56) References Cited

U.S. PATENT DOCUMENTS 3,031,555 A 4/1962 Ross et al.
4,694,134 A * 9/1987 Ross .................... B23K 13/025 219/613

(Continued)

FOREIGN PATENT DOCUMENTS

EP 0246660 B1 8/1995
JP 5562690 S 5/1980

(Continued)

OTHER PUBLICATIONS

International Search Report and Written Opinion dated Oct. 13, 2021 of corresponding International Application No. PCT/US2021/039095, 11 pages.

*Primary Examiner* — Quang T Van
(74) *Attorney, Agent, or Firm* — Lippes Mathias LLP

(57) ABSTRACT

An induction heating apparatus and method of use wherein the apparatus includes two poles, each pole having a pair of spaced apart coils wherein at least one of a spacing between the poles and the pole pitch is adjustable to control the power density transferred to a workpiece across its width. In some embodiments, movable flux shields are also adjusted to control power density transferred along edge portions of the workpiece.

24 Claims, 20 Drawing Sheets

(58) Field of Classification Search

CPC .......... H05B 6/104; H05B 6/362; H05B 6/40; H05B 6/44; Y02P 10/25

USPC ....... 219/635, 634, 639, 645, 653, 646, 662, 219/670; 118/639, 725, 715, 730, 732, 118/55

See application file for complete search history.

(56) References Cited

U.S. PATENT DOCUMENTS

| | | | | |
|---|---|---|---|---|
| 4,751,360 | A | 6/1988 | Ross | |
| 4,778,971 | A | 10/1988 | Sakimoto | |
| 4,788,396 | A * | 11/1988 | Maugein | H01M 4/043 219/673 |
| 5,126,522 | A | 6/1992 | Katayama et al. | |
| 5,397,877 | A | 3/1995 | Couffet et al. | |
| 5,403,994 | A | 4/1995 | Havas et al. | |
| 5,582,790 | A * | 12/1996 | Ferry | F27D 99/0006 266/104 |
| 5,739,506 | A | 4/1998 | Hanton et al. | |
| 6,498,328 | B2 | 12/2002 | Anderhuber et al. | |
| 6,570,141 | B2 | 5/2003 | Ross | |
| 7,482,559 | B2 | 1/2009 | Cao et al. | |
| 7,525,073 | B2 | 4/2009 | Lovens et al. | |
| 9,445,460 | B2 | 9/2016 | Lovens | |
| 9,462,641 | B2 | 10/2016 | Akers | |
| 9,888,529 | B2 * | 2/2018 | Hirota | H05B 6/104 |
| 9,930,730 | B2 | 3/2018 | Lovens | |
| 10,638,553 | B2 | 4/2020 | Minen et al. | |
| 10,757,764 | B2 | 8/2020 | Fontaine et al. | |
| 2002/0121512 | A1 | 9/2002 | Thorpe et al. | |
| 2002/0148830 | A1 | 10/2002 | Ross | |
| 2011/0289790 | A1 | 12/2011 | Kazama et al. | |
| 2012/0305547 | A1 | 12/2012 | Fukutani | |

FOREIGN PATENT DOCUMENTS

| | | | |
|---|---|---|---|
| JP | 63252382 | S | 10/1988 |
| JP | 2010170951 | A | 10/2010 |
| KR | 20120070035 | A | 6/2012 |

* cited by examiner

TRANSVERSE FLUX INDUCTION HEATING DEVICE FOR HEATING FLAT PRODUCT

BACKGROUND

Induction heaters are desirable for heating various thickness and widths of electrically conductive continuous flat strip/plate products, as shown in FIG. 1. Previous induction heating uses a solenoid type coil wrapped around the strip or plate, as shown in FIG. 2. FIG. 1 shows heating a bandwidth on a plate. FIG. 2 shows conventional solenoid coil wrapped around plate. An AC current is applied to the coil producing an electromagnetic field that induces eddy current around the surface of the plate mirroring the current in the coil resulting in joule heating of the plate. Solenoid coil heating systems suffer from several drawbacks that make it an undesirable choice for this particular application. The first problem is that the thinner the plate, the higher the induction frequency that is required to efficiently inductively couple to the plate. At the same time, a frequency must be chosen that is not so high that you will overheat the edges of the plate or overheat the surface before the core of the plate can get to temperature. This requires very high frequencies to heat thin plates, and lower frequencies to heat thicker plates. A wide frequency range may be required from a single power supply, or multiple power supplies each with a different frequency for each plate thickness to be heated. In these situations, induction heating may not be cost effective. In addition, for very thin plates, the required frequency to efficiently heat the strip by conventional solenoid coil induction technology may be higher than reasonably available such than induction heating may not be an option.

Transverse flux inductive heating is known. For example, U.S. Pat. No. 9,462,641, which is hereby incorporated by reference in its entirety, disclose a transverse induction heating apparatus that can be used for heating a strip of sheet material. Current transverse inductive heating devices lack the ability to accurately and precisely control the power density transferred to a sheet of across its length, and often either overheat edge portions of the strip or underheat center portions or the strip. In addition, current transverse inductive heating devices are generally only capable of accepting a narrow range of strip material dimensions.

SUMMARY

The present disclosure sets forth an induction heating apparatus and method of use wherein the apparatus includes two poles, each pole comprising a pair of spaced apart coils wherein at least one of a spacing between the poles and the pole pitch is adjustable to control the power density transferred to a workpiece across its width. In some embodiments, movable flux shields are also adjusted to control power density transferred along edge portions of the workpiece.

In accordance with one aspect of the present disclosure, a transverse flux induction coil assembly for induction heating at least a portion of an associated flat workpiece traveling along a process direction relative to the transverse flux electric induction coil assembly, the associated workpiece having opposite first and second workpiece sides and first and second workpiece edges, the induction heating apparatus comprising a first planar coil and a second planar coil arranged in a first common plane spaced from and facing the first workpiece side and extending between the first and second workpiece edges and electrically coupled in series. The first planar coil and the second planar coil are co-planarly spaced apart and at least one of the first planar coil and second planar coil is movable within the common plane to change the spacing therebetween.

At least one of the first planar coil and the second planar coil can be adjustable to change a pitch of the coil. The first planar coil can be formed from a first outgoing leg and a first return leg extending in a common direction and in spaced apart relation. The first outgoing leg and first return leg can be physically and electrically coupled to a first end rail, and at least one of the first outgoing leg and the first return leg can be movably mounted to the first end rail such that the first outgoing leg and first return leg are movable towards and away from each other to change a coil pitch of the first planar coil. The second planar coil can be formed from a second outgoing leg and a second return leg extending in a common direction and in spaced apart relation. The second outgoing leg and second return leg can be coupled to a second end rail, and at least one of the second outgoing leg and the second return leg can be movably mounted to the second end rail such that the second outgoing leg and second return leg are movable towards and away from each other to change a coil pitch of the second planar coil.

The first planar coil and the second planar coil can each be coupled to a first common rail, at least one of the first coil or second coil movably supported on the first common rail for movement towards or away from the other of the first or second coil. The first return leg of the first coil and the second outgoing leg of the second coil can be coupled to the first common rail, and at least one of the first return leg and second outgoing leg can be movable relative to the common rail to change a distance between the first planar coil and the second planar coil.

The assembly can further comprise a third planar coil and a fourth planar coil arranged in a second common plane spaced from and facing the second workpiece side and extending between the first and second workpiece edges and electrically coupled in series with the first planar coil and the second planar coil. The third planar coil and the fourth planar coil can be co-planarly spaced apart in the second common plane and at least one of the third planar coil and fourth planar coil can be movable within the second common plane to change the spacing therebetween. At least one of the third planar coil and the fourth planar coil can be adjustable to change a pitch of the coil.

The third planar coil can be formed from a third outgoing leg and a third return leg extending in a common direction and in spaced apart relation, the third outgoing leg and third return leg physically and electrically coupled to a third end rail. At least one of the third outgoing leg and the third return leg can be movably mounted to the third end rail such that the third outgoing leg and third return leg are movable towards and away from each other to change a coil pitch of the third planar coil. The fourth planar coil can be formed from a fourth outgoing leg and a fourth return leg extending in a common direction and in spaced apart relation, the fourth outgoing leg and fourth return leg coupled to an fourth end rail. At least one of the fourth outgoing leg and the fourth return leg can be movably mounted to the fourth end rail such that the fourth outgoing leg and fourth return leg are movable towards and away from each other to change a coil pitch of the fourth planar coil.

The third planar coil and the fourth planar coil can be each coupled to a second common rail, at least one of the third planar coil or fourth planar coil movably supported on the second common rail for movement towards or away from the other of the third or fourth planar coil. The third return leg of the third coil and the fourth outgoing leg of the fourth coil can be coupled to the second common rail, at least one of the third return leg and fourth outgoing leg movable relative to the second common rail to change a distance between the third planar coil and the fourth planar coil. The return leg of the second planar coil and the outgoing leg of the third planar coil can be rigidly coupled together.

The assembly can further include at least one flux shield spaced from and disposed between the first common plane and the first workpiece side facing at least one of the first and second workpiece edges, wherein the at least one flux shield is movable in a transverse direction of the associated workpiece.

In accordance with another aspect, a transverse flux induction coil assembly for induction heating at least a portion of an associated flat workpiece traveling along a process direction relative to the transverse flux electric induction coil assembly, the associated workpiece having opposite first and second workpiece sides and first and second workpiece edges comprises a first planar coil and a second planar coil arranged in a first common plane spaced from and facing the first workpiece side and extending between the first and second workpiece edges and electrically coupled in series, wherein at least one of the first planar coil and the second planar coil is adjustable to change a pitch of the coil.

The first planar coil can be formed from a first outgoing leg and a first return leg extending in a common direction and in spaced apart relation, the first outgoing leg and first return leg can be physically and electrically coupled to a first end rail. At least one of the first outgoing leg and the first return leg can be movably mounted to the first end rail such that the first outgoing leg and first return leg are movable towards and away from each other to change a coil pitch of the first planar coil. The second planar coil can be formed from a second outgoing leg and a second return leg extending in a common direction and in spaced apart relation, the second outgoing leg and second return leg coupled to an second end rail. At least one of the second outgoing leg and the second return leg can be movably mounted to the second end rail such that the second outgoing leg and second return leg are movable towards and away from each other to change a coil pitch of the second planar coil.

The assembly can further include a third planar coil and a fourth planar coil arranged in a second common plane spaced from and facing the second workpiece side and extending between the first and second workpiece edges and electrically coupled in series with the first planar coil and the second planar coil. At least one of the third planar coil and the fourth planar coil can be adjustable to change a pitch of the coil. The third planar coil can be formed from a third outgoing leg and a third return leg extending in a common direction and in spaced apart relation, the third outgoing leg and third return leg physically and electrically coupled to a third end rail. At least one of the third outgoing leg and the third return leg can be movably mounted to the third end rail such that the third outgoing leg and third return leg are movable towards and away from each other to change a coil pitch of the third planar coil. The fourth planar coil can be formed from a fourth outgoing leg and a fourth return leg extending in a common direction and in spaced apart relation, the fourth outgoing leg and fourth return leg coupled to an fourth end rail. At least one of the fourth outgoing leg and the fourth return leg movably mounted to the fourth end rail such that the fourth outgoing leg and fourth return leg are movable towards and away from each other to change a coil pitch of the fourth planar coil.

In accordance with another aspect, a method of inductively heating an associated strip workpiece comprises supplying current to a transverse flux electric induction coil assembly for induction heating at least a portion of the associated strip workpiece traveling along a process direction relative to the transverse flux electric induction coil assembly, the associated workpiece having opposite first and second workpiece sides and first and second workpiece edges, the induction heating apparatus comprising: a first planar coil and a second planar coil arranged in a first common plane spaced from and facing the first workpiece side and extending between the first and second workpiece edges and electrically coupled in series, wherein the first planar coil and the second planar coil are co-planarly spaced apart and at least one of the first planar coil and second planar coil is movable within the common plane to change the spacing therebetween; and adjusting the spacing between the first and second coil. At least one of the first planar coil and the second planar coil can be adjustable to change a pitch of the coil, and the method can further include adjusting the pitch of at least one of the coils.

BRIEF DESCRIPTION OF THE DRAWINGS

FIG. 11*b* 11*a* is a perspective view showing a second configuration of a pair of wide oval type coils and flux shields on each side of a narrow strip material;

DETAILED DESCRIPTION

Figure 1:
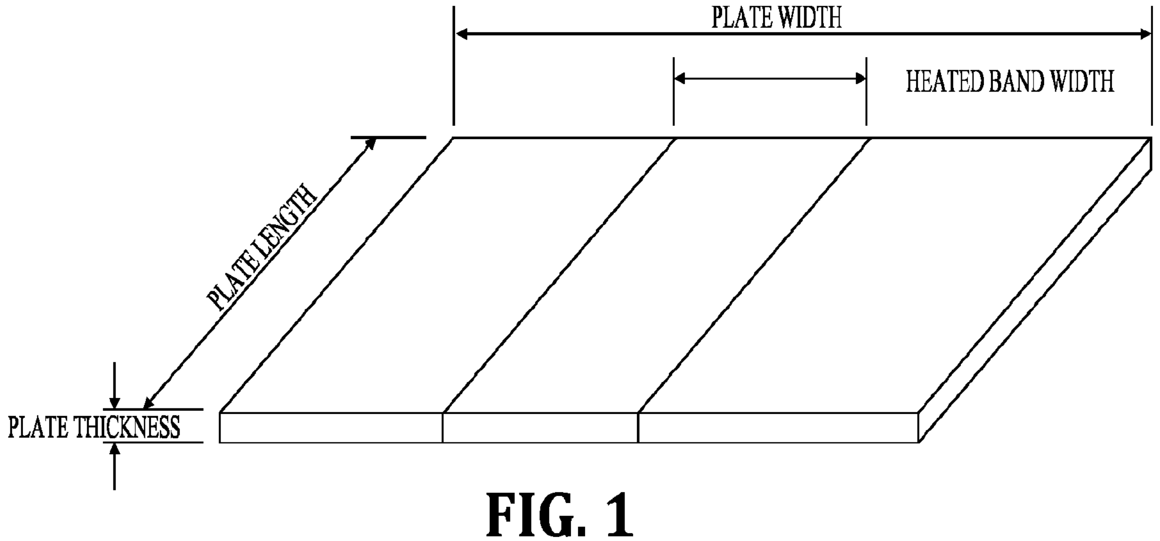
FIG. 1 is a perspective view of a sheet material to be heated in accordance with aspects of the present disclosure.
Figure 2:
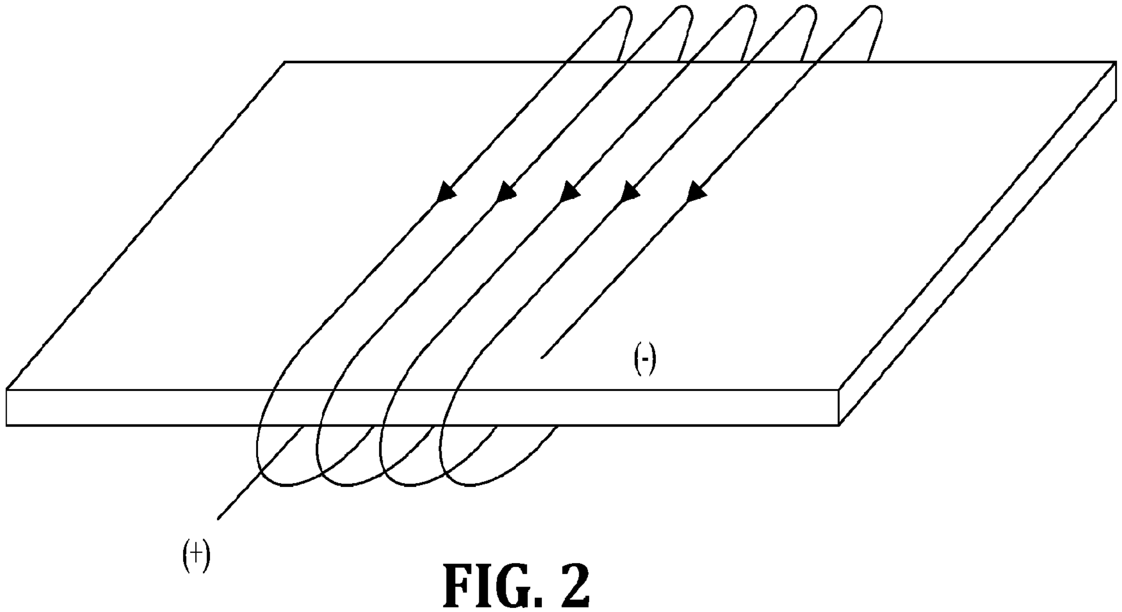
FIG. 2 is a perspective view of a conventional solenoid coil wrapped around a sheet material to be heated.

In the drawings, like reference numerals refer to like elements throughout, and the various features are not necessarily drawn to scale. Also, the term "couple" or "couples" includes indirect or direct electrical or mechanical connection or combinations thereof. For example, if a first device couples to or is coupled with a second device, that connection may be through a direct electrical connection, or through an indirect electrical connection via one or more intervening devices and connections. One or more operational characteristics of various circuits, systems and/or components are hereinafter described in the context of functions which in some cases result from configuration and/or interconnection of various structures when circuitry is powered and operating.

Due to the above problems with solenoid induction heating, particularly for very thin strips or plates, transverse flux technology has been used in place of conventional solenoid heating technology. Many different transverse flux designs have been developed. Many of these designs are very cumbersome and require many moving parts which become a high maintenance item. In one example, a flat strip/plate is heated using a transverse flux design where either a single frequency or a small variation in frequency can be selected to efficiently heat all of the plate/strip sizes utilizing a frequency range available from a single power supply. It is desirable to have the lowest possible frequency and still be able to heat the plate without overheating any part of it. The second drawback of utilizing a solenoid type coil, is that the coil is wrapped around the plate, making handling of the plate from heating to the bending station difficult. In the case of a strip, the coil cannot be removed with the continuous strip inside of it. Where the workpiece is very wide, a typical in-line seam anneal coil generally cannot be designed to uniformly heat the entire width. Therefore, it would be beneficial to use an induction heating coil configuration that does not surround the plate/strip to be heated.

Figure 3:
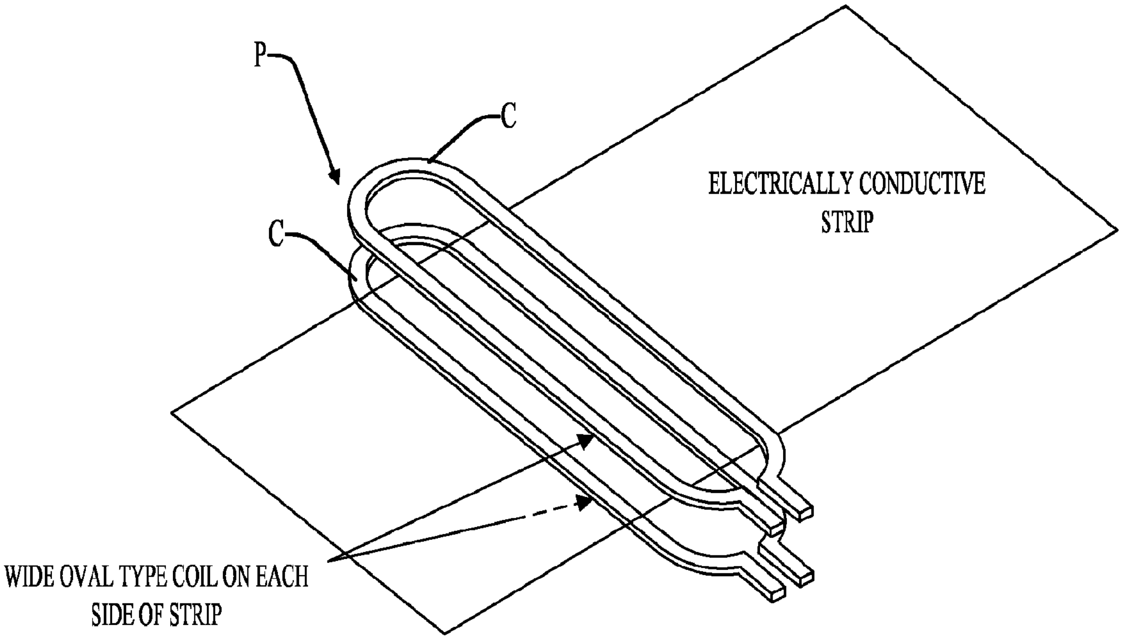
FIG. 3 is a perspective view of a transverse flux wide oval type coil for heating a strip material.
Figure 4:
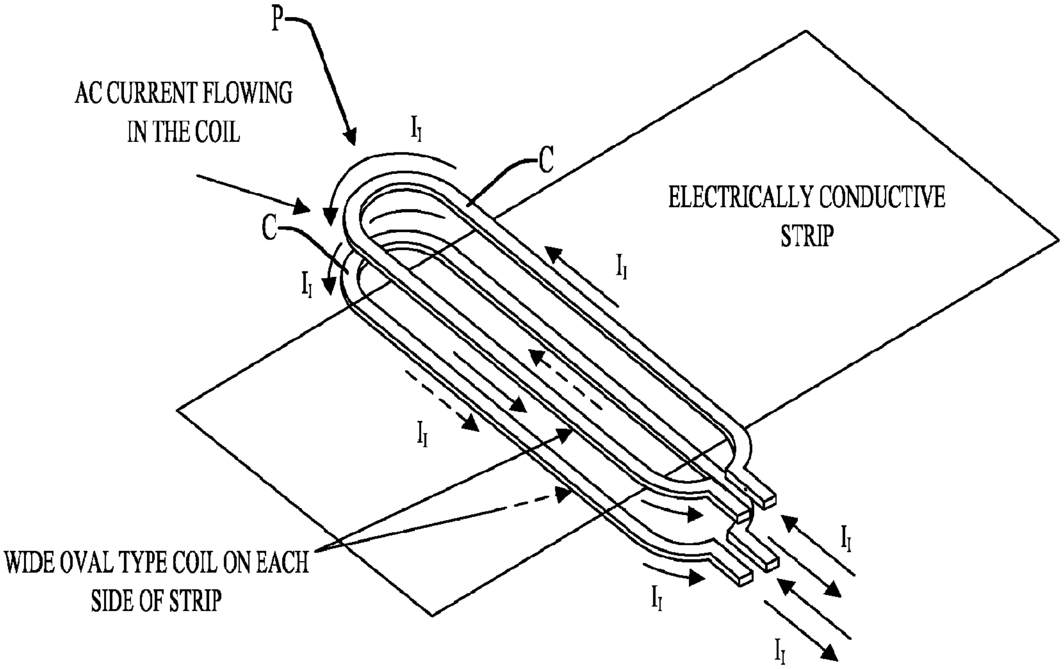
FIG. 4 is a perspective view showing AC current flowing in the coil of FIG. 3.
Figure 5:
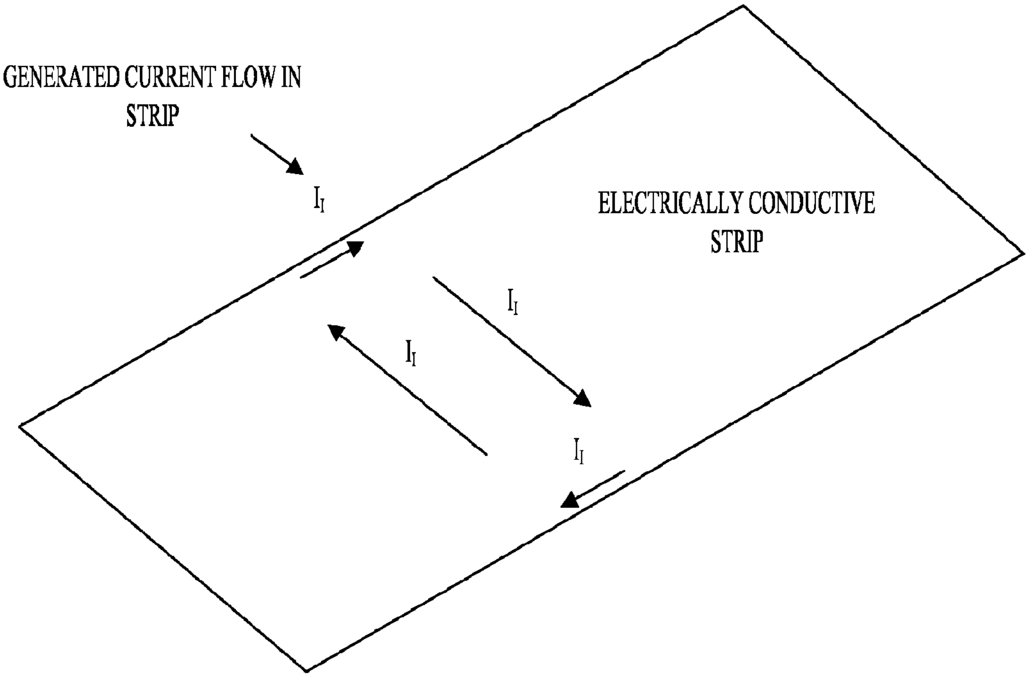
FIG. 5 is a perspective of the current generated in the strip material by the coil of FIG. 3.

Referring also to FIGS. 3-5, one aspect of the present disclosure provides a transverse flux coil designed such that the strip S passes between a pair of wide oval type coils C, collectively referred to as a pole P, as shown in FIG. 3. FIG. 3 shows a simple transverse flux induction heating coil setup showing the configuration of a pole P with a relationship to the strip. FIG. 4 shows applied current in the wide oval coils C. FIG. 5 shows generated current flow on strip surface (typical each side). Generally, the coils C are positioned such they are directly in line with each other or may be a mirror image of each other on either side of the strip, although not a strict requirement of all possible implementations. The coils C are connected electrically in series with each other such that the current in the coils C on either side of the strip are electrically in phase with each other as shown in FIG. 4. This results in an induced current flow in the strip as shown in FIG. 5.

Figure 6:
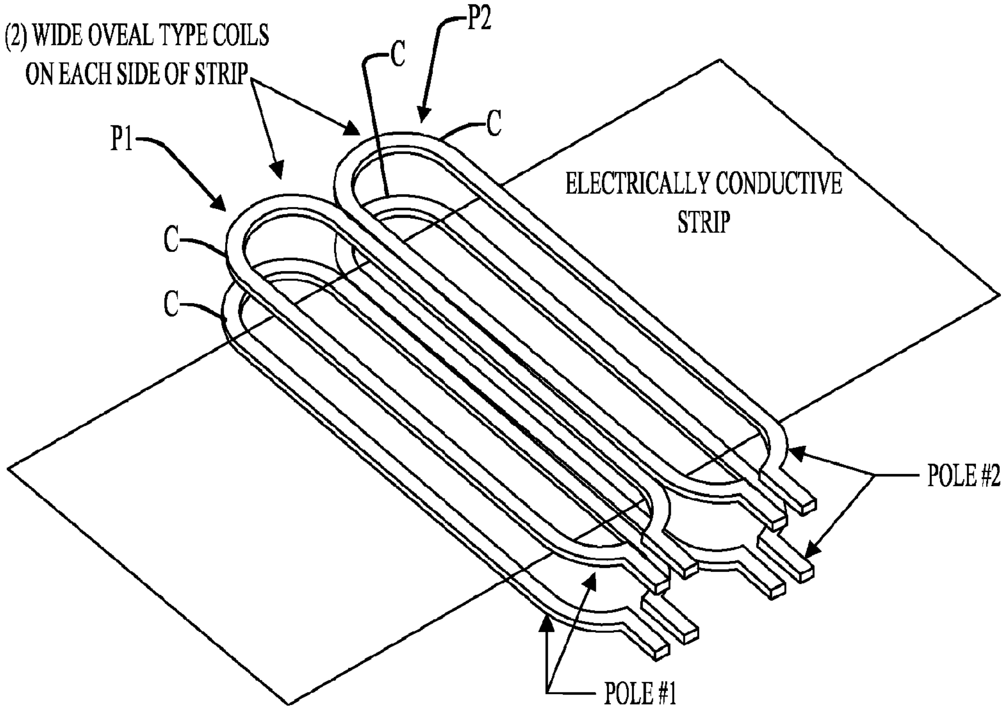
FIG. 6 is a perspective view of a pair of wide oval type coils on each side of a strip material.
Figure 7A:
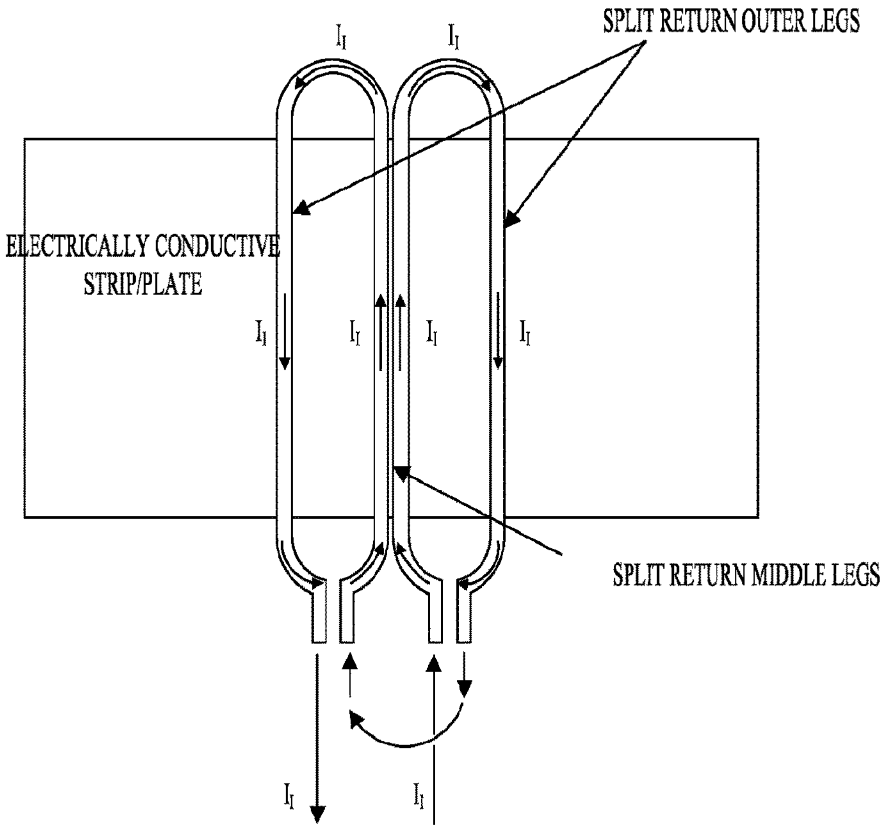
FIG. 7*a* is a plan view showing AC current flowing in the coils of FIG. 6.
Figure 7B:
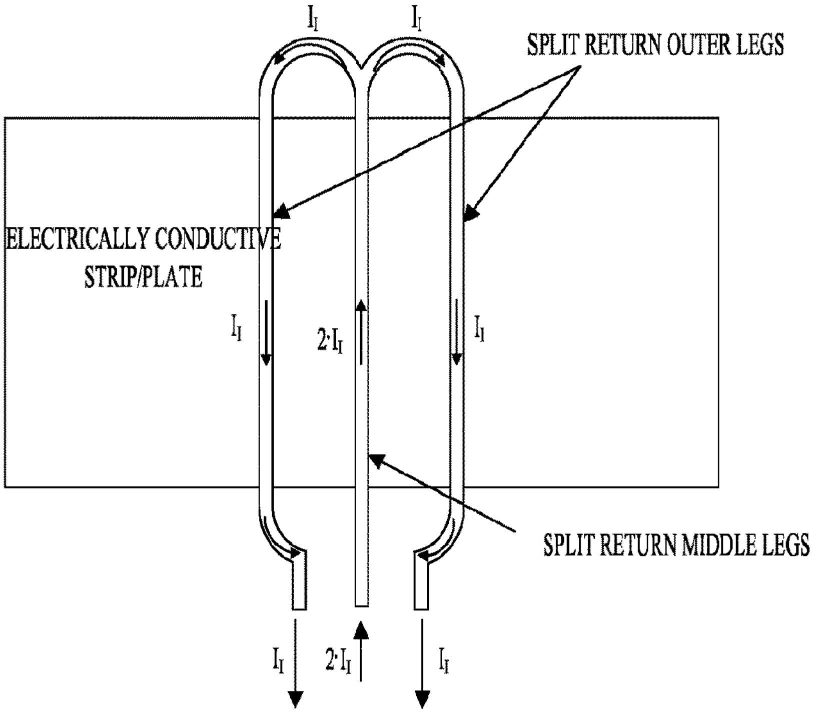
FIG. 7*b* is a plan view showing AC current flowing in the coils of a split return inductor.

Referring also to FIGS. 6 and 7*a* and 7*b*, in one example, a pair of wide oval transverse flux coils C are provided on each side of the strip forming at least two poles P1 and P2. Each of the coils C are electrically connected in series and in phase with respect to each of the surfaces to behave like a split return inductor as shown in FIG. 7*a*. FIG. 7*b* shows the configuration and current flow in a typical split return inductor. FIGS. 7*a* and 7*b* respectively show (FIG. 7*a*) the coil configuration of the present disclosure is designed to inductively behave like a (FIG. 7*b*) conventional split return inductor.

Figure 8A:
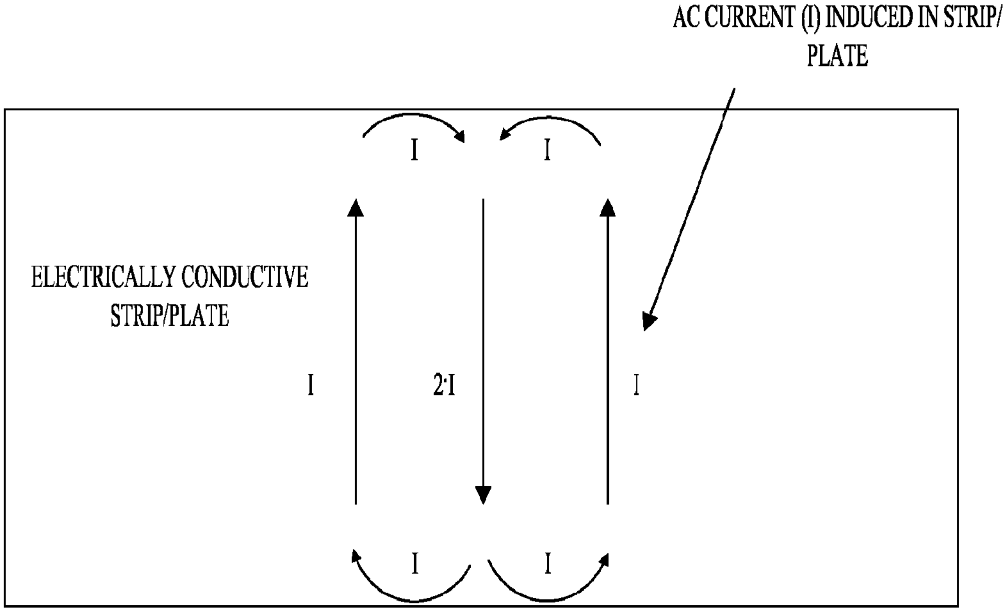
FIG. 8*a* is a plan view showing a current generated in the strip using a split return transverse flux inductor of FIG. 7*b;*
Figure 8B:
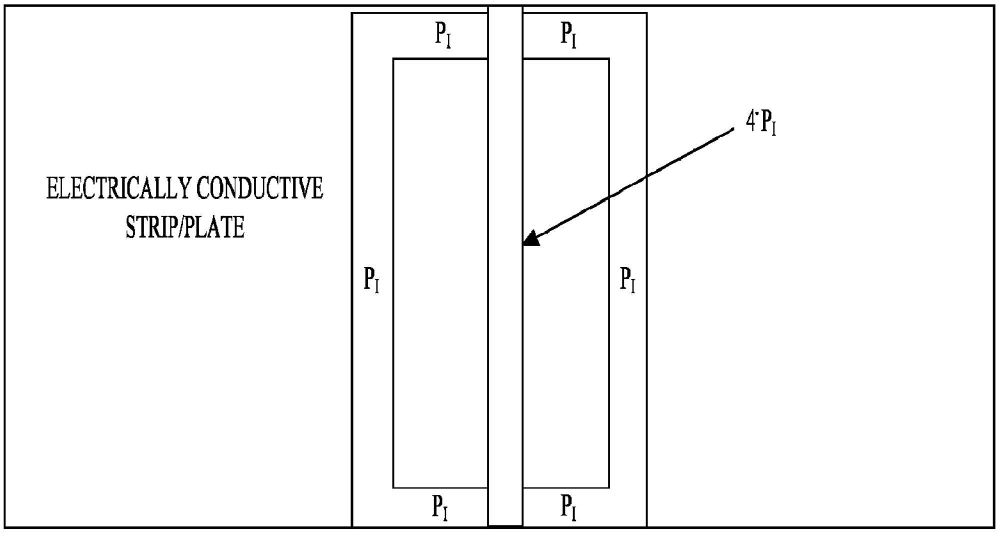
FIG. 8*b* is a plan view showing power density generated in the strip by a split return transverse flux inductor.

FIGS. 8*a* and 8*b* respectively show (FIG. 8*a*) a current generated in the strip using a split return transverse flux inductor, and (FIG. 8*b*) power density generated in the strip by a split return transverse flux inductor. In a split return inductor, typically the main heating of the strip occurs along the middle section of the inductor assembly where the current is double/virtually double that of the outer legs of the inductor. Since power is proportional to the current squared× resistance ($P=I^2 \cdot R$) then if the current density is double along the middle conductor(s) of the pole pair, then power generated in the strip is increased 4 times. In a typical split return design transverse flux inductor, the induced current is similar to that shown in FIG. 8*a*, resulting in a relative power density distribution in the strip as shown in FIG. 8*b*.

Figure 9A:
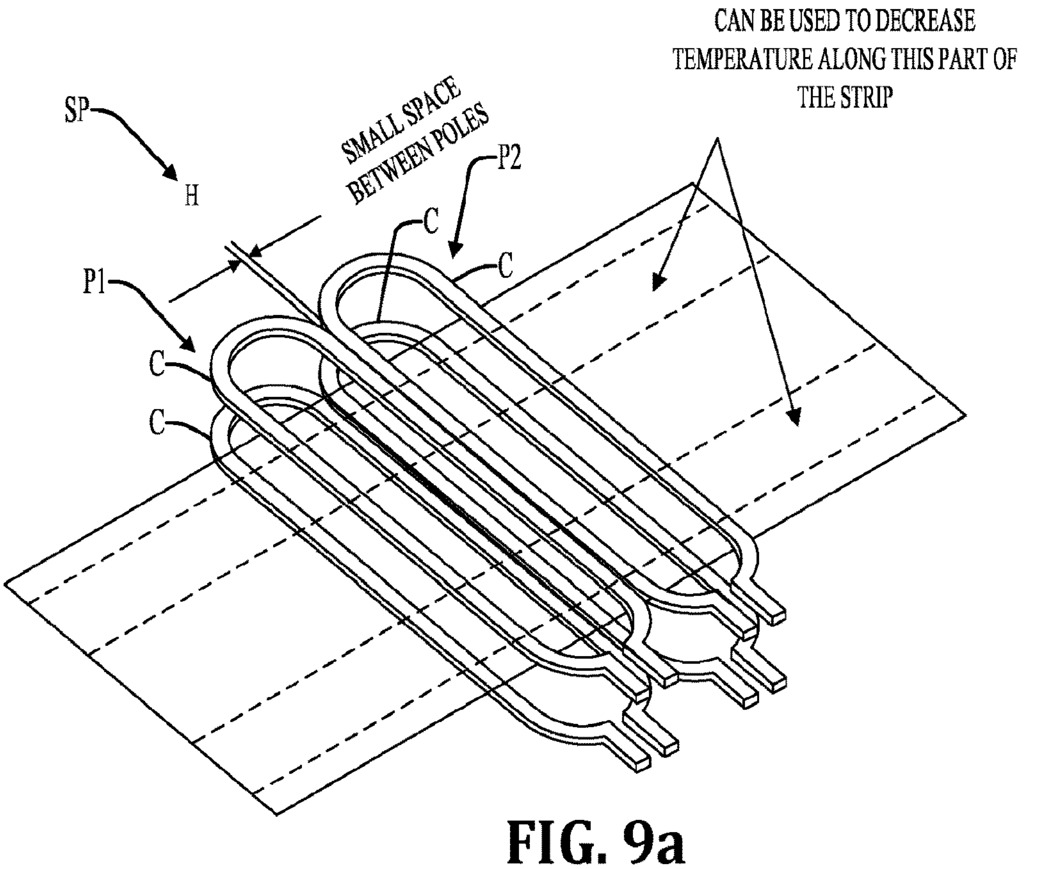
FIG. 9*a* is a perspective view showing a first configuration of a pair of wide oval type coils on each side of a strip material.
Figure 9B:
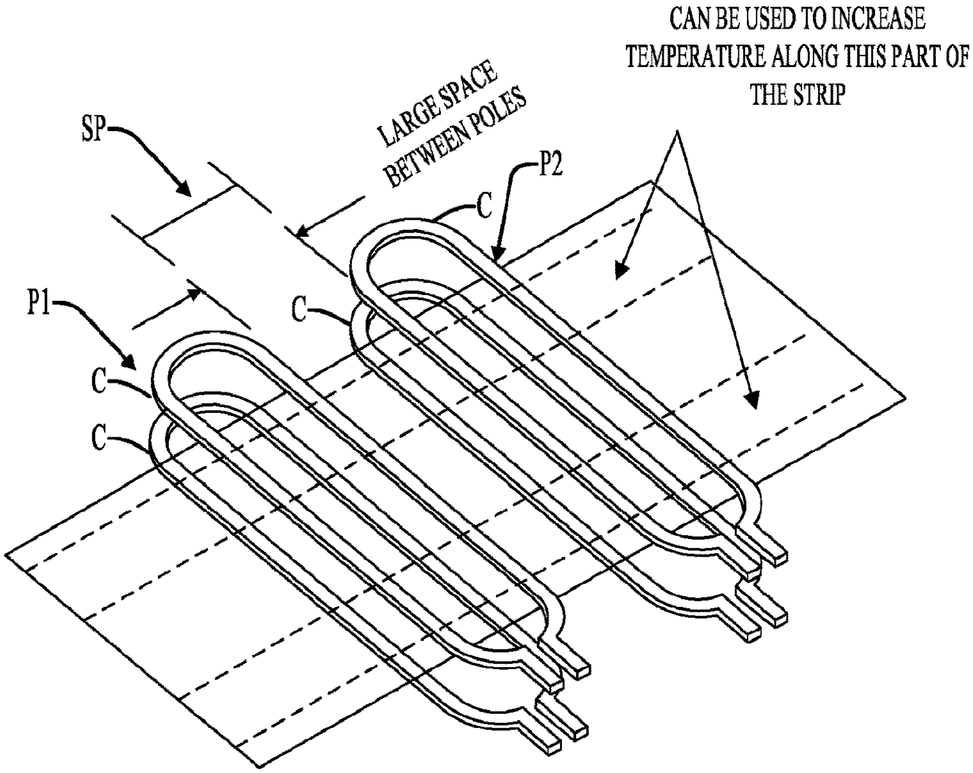
FIG. 9*b* is a perspective view showing a second configuration of a pair of wide oval type coils on each side of a strip material.

FIGS. 9*a* and 9*b* show that the space between the poles P1 and P2 in the transverse inductor, as shown in FIG. 7*a*, can be adjusted to change the heating pattern across the width of the strip. This example provides the ability to adjust the spacing SP between the center legs of each of the wide oval coils C as shown in FIGS. 9*a* and 9*b*. This feature provides the ability to adjust the power density across the strip and thus the resulting thermal profile across the strip.

Figure 10A:
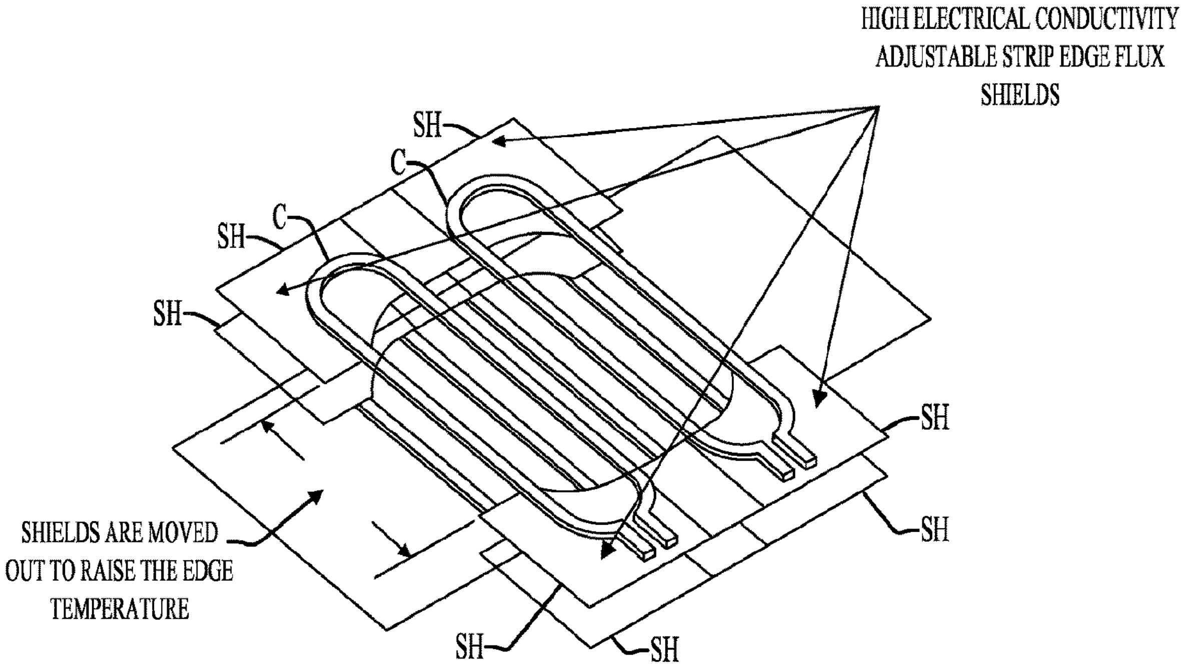
FIG. 10*a* a perspective view showing a first configuration of a pair of wide oval type coils and flux shields on each side of a strip material.
Figure 10B:
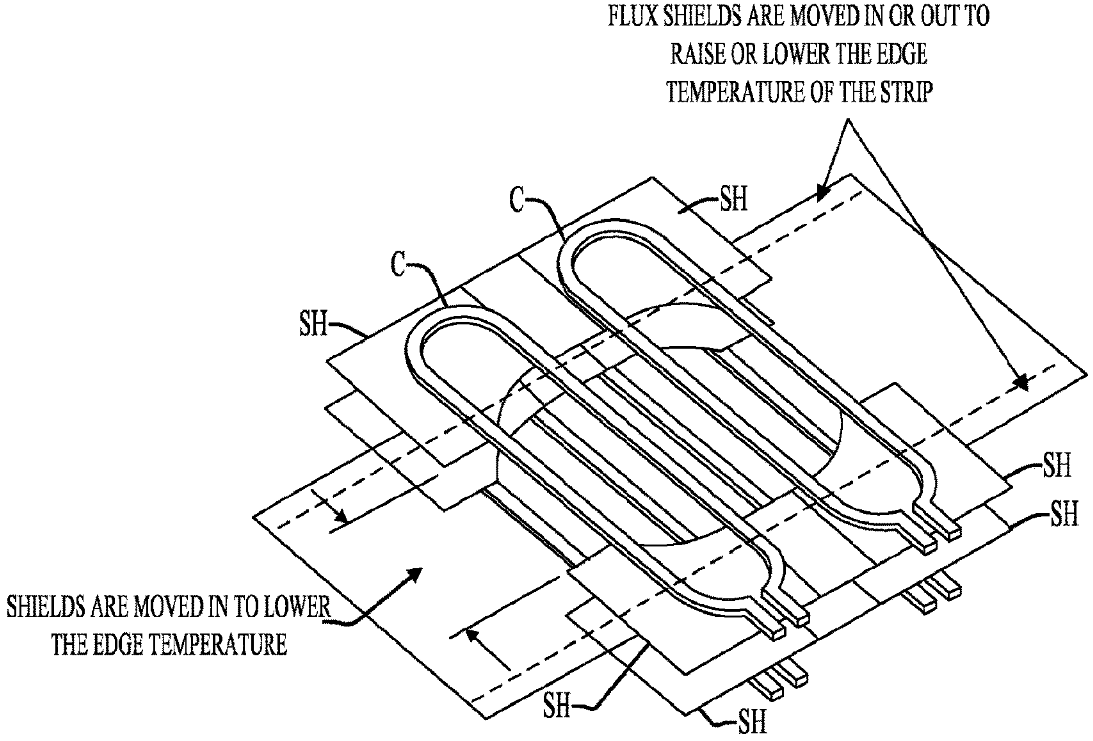
FIG. 10*b* a perspective view showing a second configuration of a pair of wide oval type coils and flux shields on each side of a strip material.
Figure 11A:
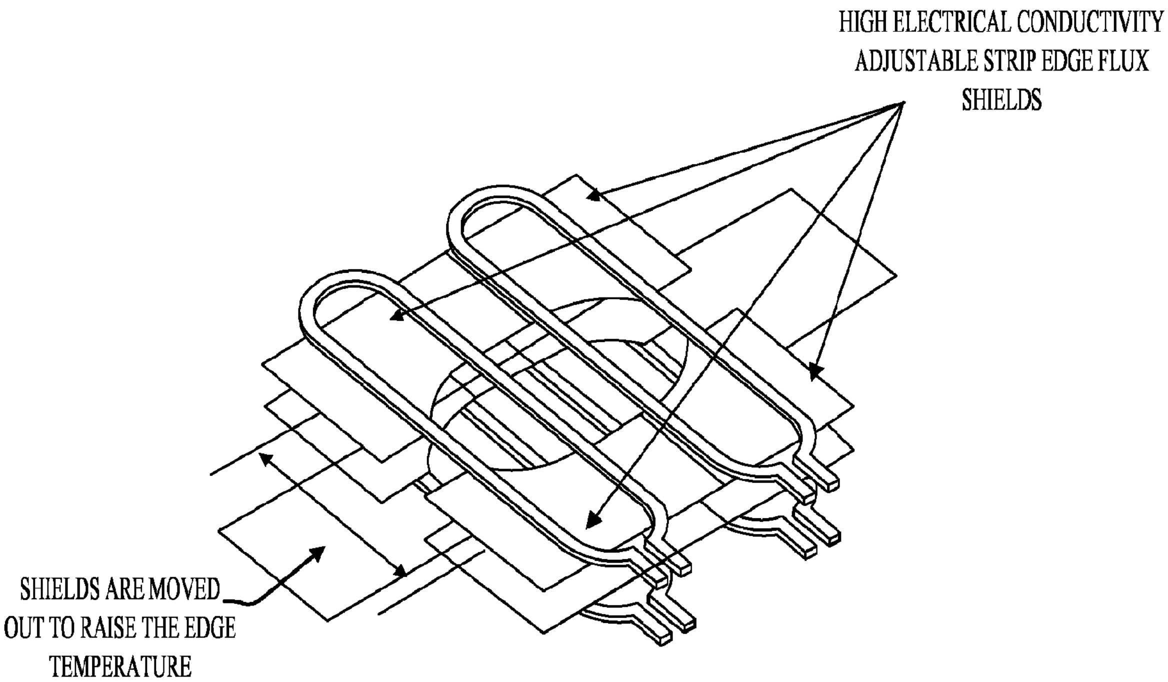
FIG. 11*a* is a perspective view showing a first configuration of a pair of wide oval type coils and flux shields on each side of a narrow strip material.
Figure 11B:
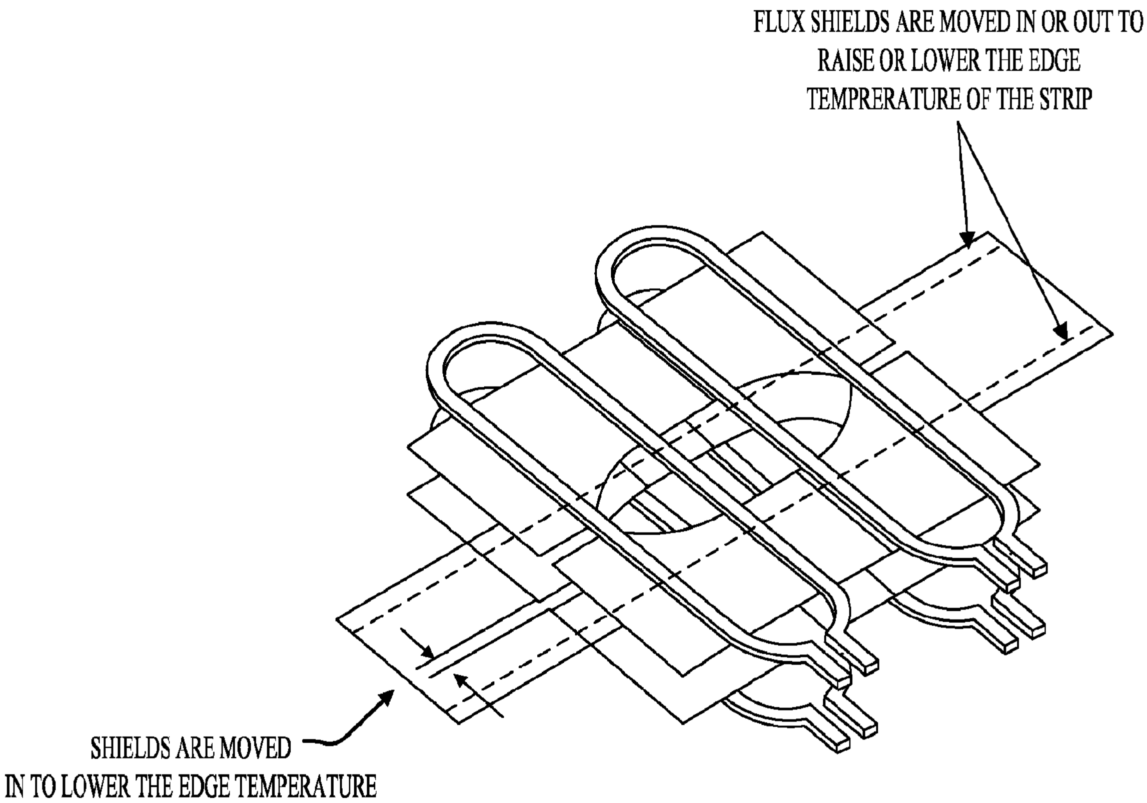

As further shown in FIGS. 10*a*, 10*b*, 11*a*, and 11*b*, further aspects provide one or more flux shields SH made from high electrical conductivity material. The shields SH are placed between the coils C and the strip to be heated as shown in FIGS. 10(*a*) and 10(*b*). The shields SH are moveable (e.g., along the plate length direction shown in FIG. 1) and are used to shield the edges of the strip from the electromagnetic field to minimize overheating of the edges of the strip. The shields SH are adjustable so that for a narrower strip as shown in FIGS. 11(*a*) and 11(*b*) they provide the same function. FIGS. 10*a* and 10*b* shows adjustable flux shields SH are provided to control strip edge temperature. FIGS. 11*a* and 11*b* shows flux shields SH are adjustable so that they can perform the same function with a narrower strip.

Figure 12:
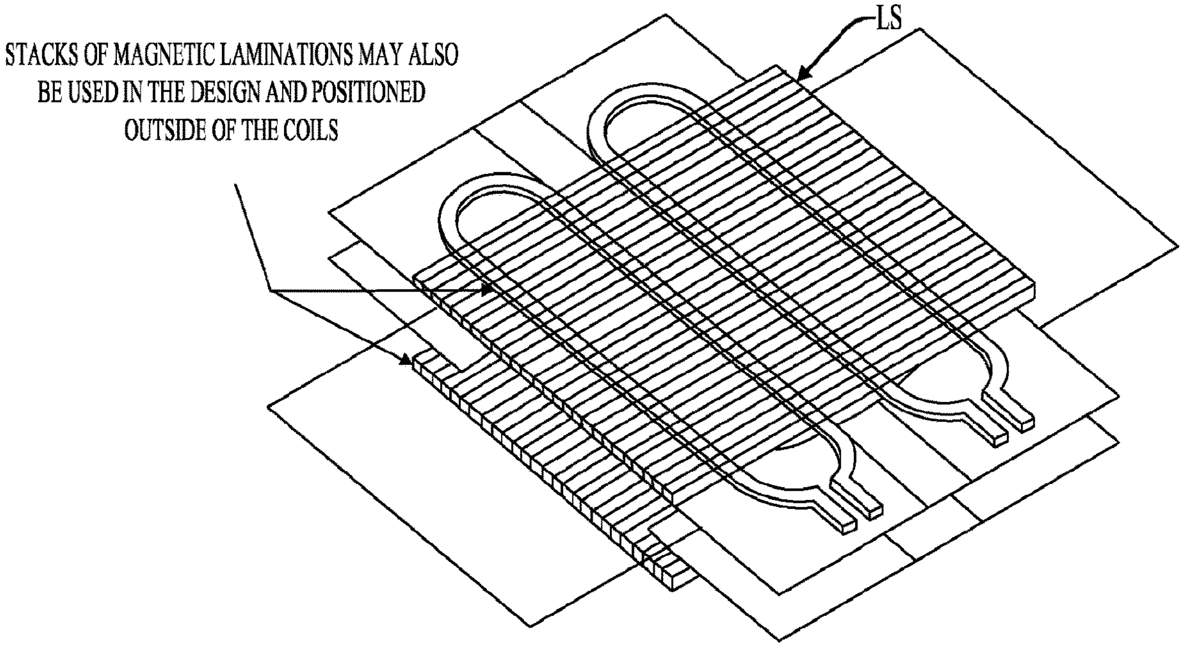
FIG. 12 is a perspective view of an inductor assembly with a stack of magnetic laminations positioned outside of the coil assembly.
Figure 13:
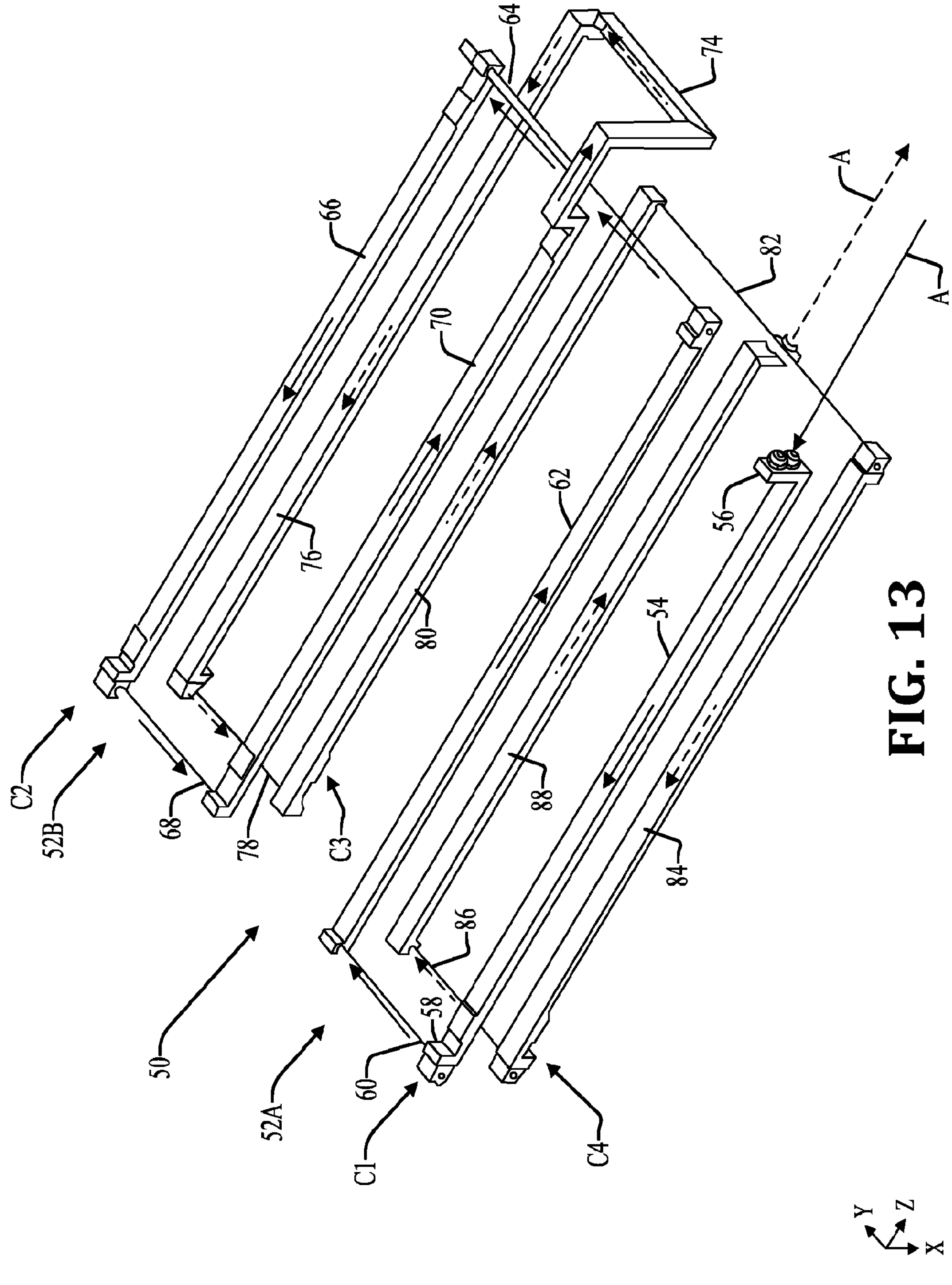
FIG. 13 is a perspective view of an exemplary induction heating assembly in accordance with the present disclosure.

Referring also to FIG. 12, the disclosed concepts in certain examples may also include stacked magnetic lamination sheets LS positioned on the outside of the coils away from the strip as shown in FIG. 12. The laminations help to increase the inductor efficiency as well as minimize stray field outside of the coils C that may induce heat into other electrically conductive objects outside of the inductor. FIG. 12 shows the inductor assembly shown with a stack of magnetic laminations LS positioned outside of the coil assembly.

FIGS. 13-20 illustrate various aspects of an exemplary embodiment of an inductive heating assembly of the present disclosure, identified generally by reference numeral 50, having two poles 52A and 52B and capable of all of the above-described adjustments including adjusting a split return gap, adjusting a pole pitch of one or both poles, and/or adjusting one or more flux shield positions to thereby accommodate more uniform heating of a wide range of strip widths in a single inductive heating assembly.

The general components of the inductive heating assembly 50 will be introduced in order of the flow of current through the assembly, and then the function of the inductive heating assembly 50 will be described. The flow of current through the assembly is denoted by arrows A in FIG. 13. Pole 52A includes a first coil C1 having an outgoing leg 54 with a first (proximal) end 56 at which current is received from a suitable power source (not shown). As used herein, the terms proximal end and distal end, in relation to legs of a coil, are taken in the direction of current flow with proximal end referring to the end of the leg that receives current and distal end referring to the end of the leg where current exits the leg. As such, leg 54 is movably supported at a second (distal) end 58 by, and electrically coupled with, an end rail or guide member 60. Rail 60 is conductive or contains conductive structures to electrically couple leg 54 with a return leg 62. A distal end of return leg 62 is movably supported by, and electrically coupled with, a common rail or guide member 64. Common rail 64 is conductive or contains conductive structures to electrically couple leg 62 of coil C1 with outgoing leg 66 of coil C2. Outgoing leg 66 is electrically coupled to end rail or guide 68. Rail 68 is conductive or contains conductive structures to electrically couple leg 66 with a return leg 70 of coil C2. Coil C2 is electrically coupled to coil C3 of pole 52B via connector 74. An outgoing leg 76 of coil C3 is electrically coupled to end rail 78. Rail 78 is conductive or contains conductive structures to electrically couple outgoing leg 76 with a return leg 80. Return leg 80 is electrically coupled to a common rail or guide member 82, which electrically couples coil C3 with outgoing leg 84 of coil C4. Outgoing leg 84 is electrically coupled to end rail 86, which is conductive or contains conductive structures to electrically couple leg 84 with a return leg 88 of coil C4. In this description, the term common rail is used for a rail or guide member that joins together coils of adjacent poles, while the term end rail is used for a rail or guide member that joins together outgoing and return legs of a given coil.

As will now be appreciated, coils C1, C2 C3 and C4 are connected in series, and the arrangement of the outgoing legs and return legs of each pair of coils (C1/C4 and C2/3) are such that current flows through the outgoing legs of each coil pair in a common direction and flows through the return legs of each coil pair in common direction, on respective sides of a sheet to be heated.

Each of the outgoing legs 54, 66, 76 and 84 are movably coupled at their distal ends to respective end rails for sliding movement relative thereto, while each of the return legs 62, 70, and 80 and 88 are fixedly coupled at their proximal ends to respective end rails. Meanwhile, outgoing legs 66 and 84 are slidable coupled at their proximal ends to respective common rails. As such, the sliding connection at the end rails facilitates movement of respective outgoing and return legs of a coil towards and away from each other to adjust a pitch of the coil, while the sliding connection at the common rails facilitate movement of the poles towards and away from each other to adjust a split return gap.

Figure 14:
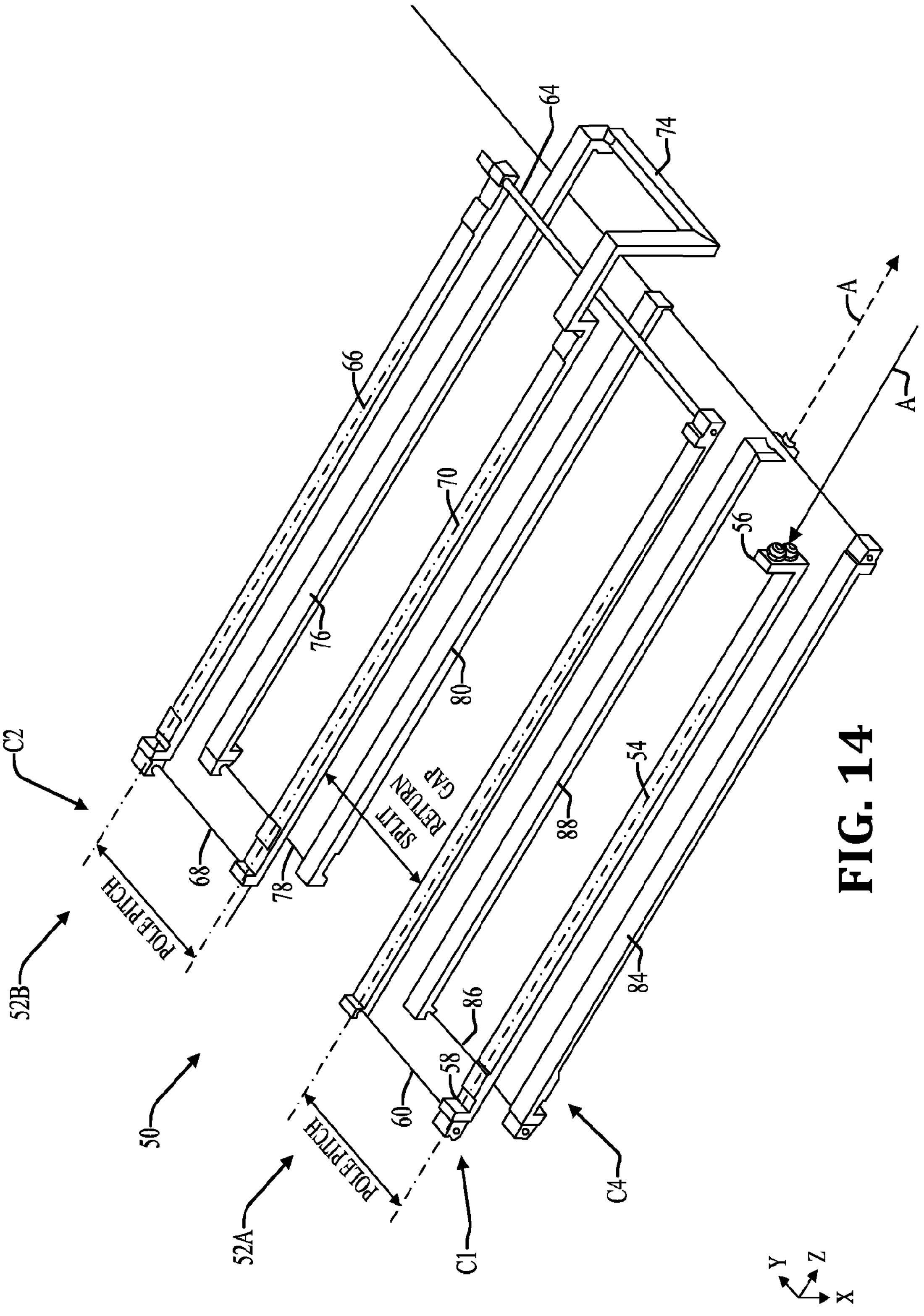
FIG. 14 is another perspective view of an exemplary induction heating assembly in accordance with the present disclosure

With reference to FIG. 14, it will be understood that relative movement of the outgoing legs 54, 66, 76 and 84 relative to the return legs 62, 70, 80 and 88 facilitates changing at least one of a split return gap (e.g., spacing between the poles 52A and 52B) and the pole pitch (e.g., spacing between the outgoing legs and return legs of a pole). Sliding of the outgoing legs on the end rails primarily effects a change in pole pitch, while sliding of return leg 62 and outgoing leg 84 on their respective common rails primarily effects a change in split return gap.

Figure 15:
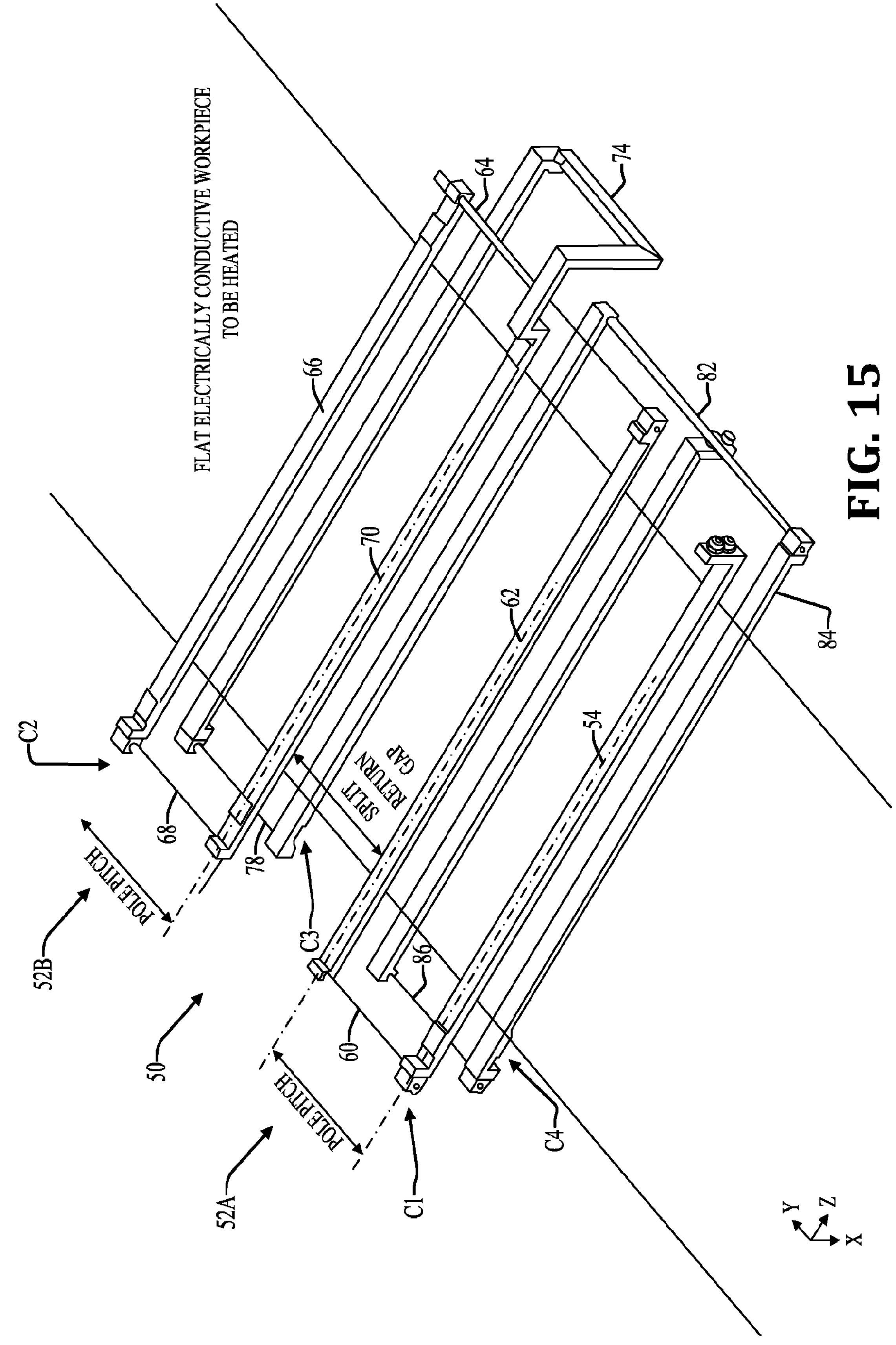
FIG. 15 is a perspective view of the exemplary induction heating assembly of FIGS. 13 and 14 and a strip of sheet material.
Figure 16:
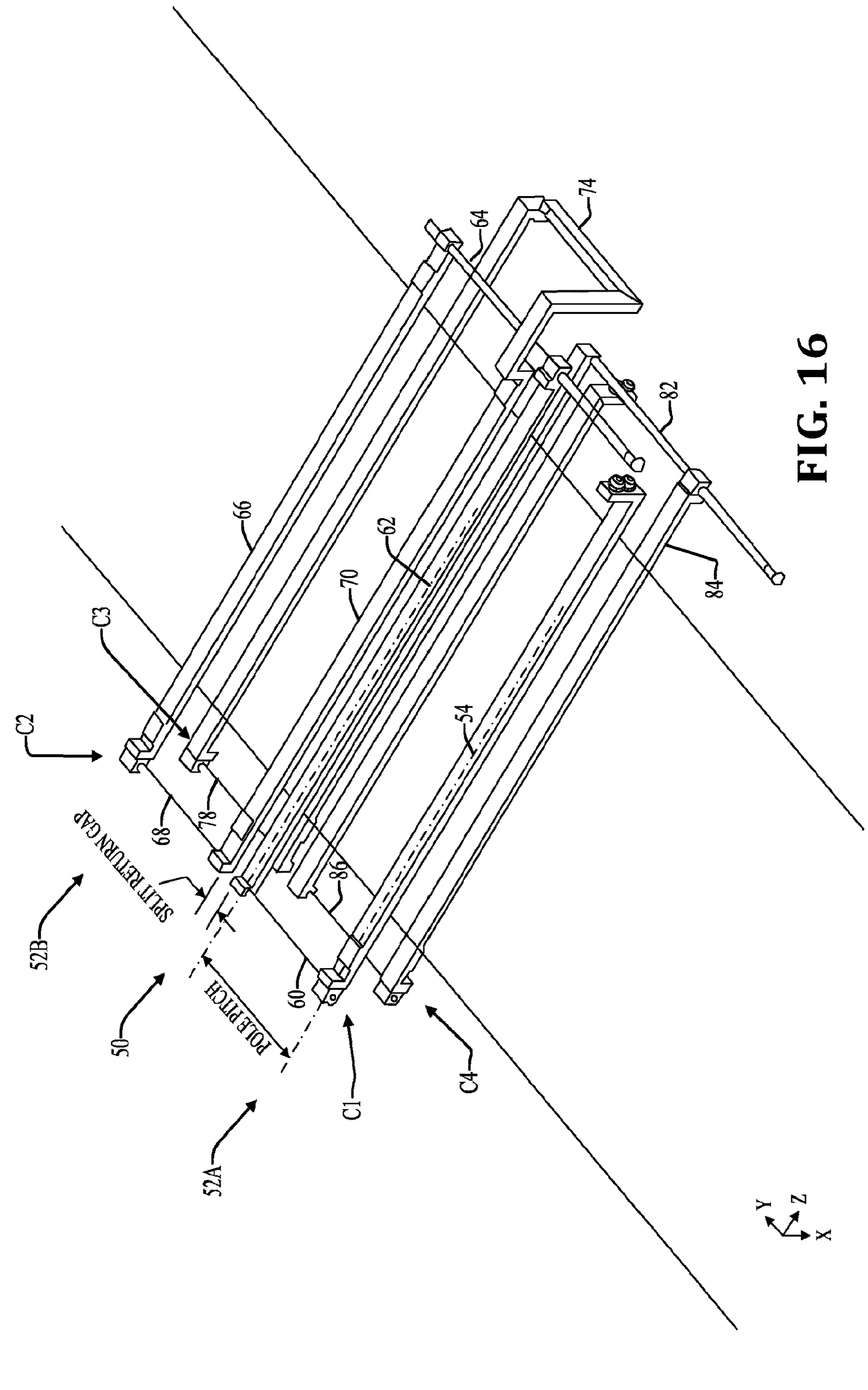
FIG. 16 is a perspective view of the exemplary induction heating assembly of FIG. 15 in a first configuration.
Figure 17:
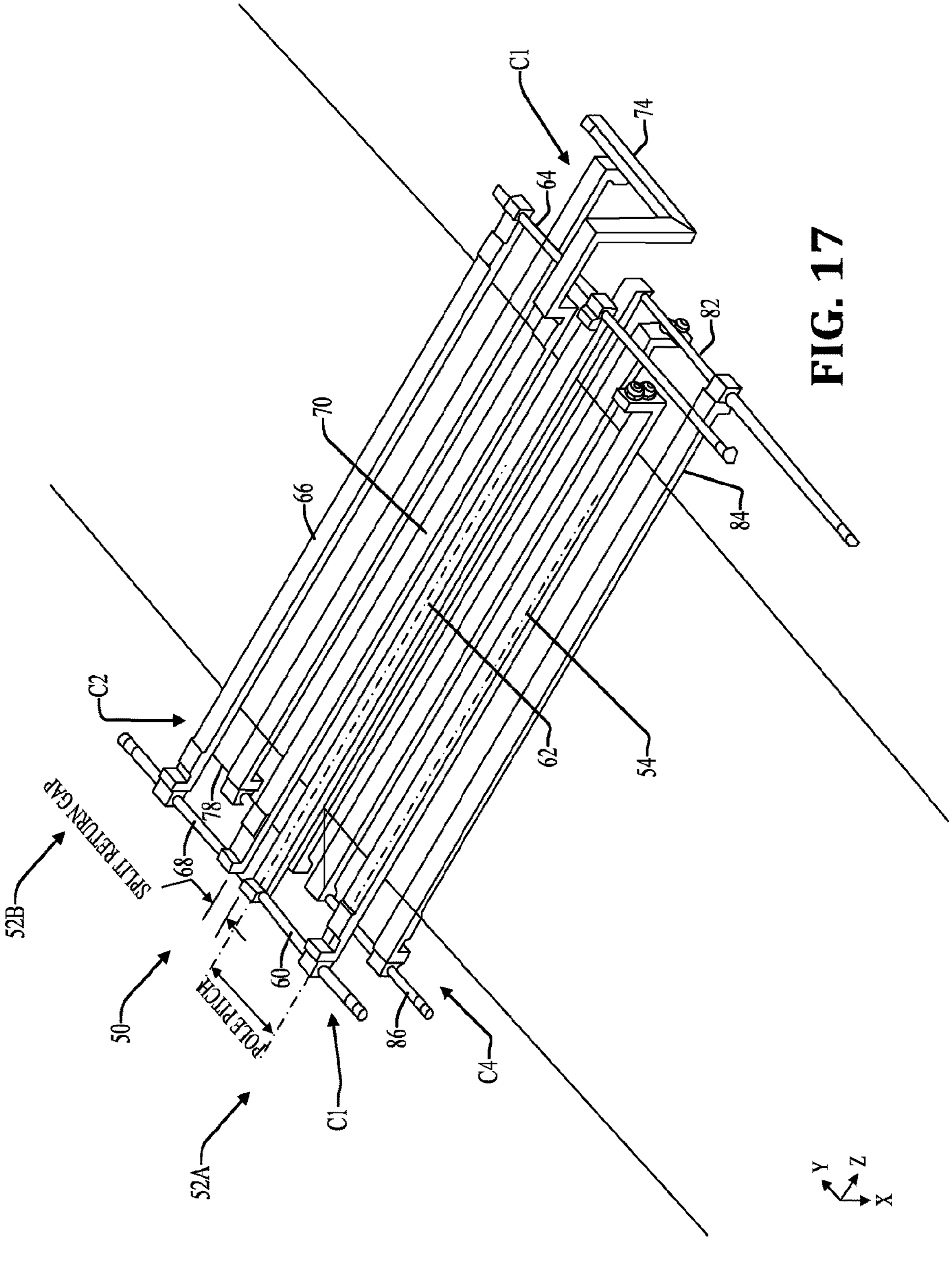
FIG. 17 is a perspective view of the exemplary induction heating assembly of FIG. 15 in a second configuration.

FIGS. 15-17 illustrate an example of possible adjustments to pole pitch and/or split return gap. In FIG. 15, pole 52A and 52B have a first pole pitch and a spaced apart at a first split return gap. In FIG. 16, pole 52A and 52B have the same pole pitch as shown in FIG. 15, but the split return gap has been decreased by moving the poles 52A and 52B closer together. In FIG. 17, the split return gap between poles 52A and 52B is the same as shown in FIG. 16, but the pole pitch of each pole 52A and 52B has been decreased by sliding of the outgoing legs 66 and 84 on the common rails. It will be appreciated that adjustments of the pole pitch and/or split return gap can allow the assembly to more precisely heat a wider range of strip material widths and thicknesses, and/or more uniformly heat a given strip, by concentrating or deconcentrating the magnetic flux generated by the coils.

Figure 18:
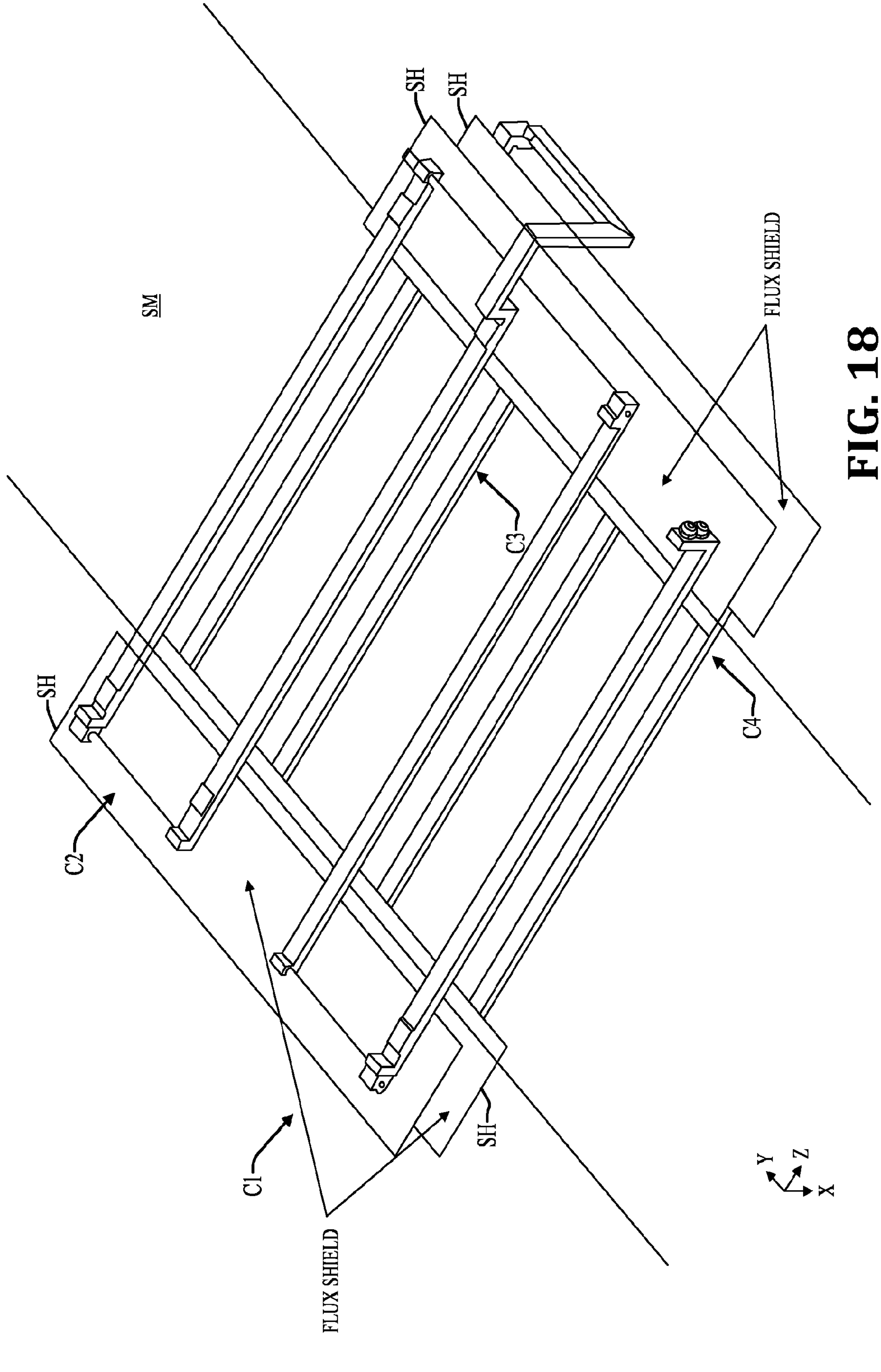
FIG. 18 is a perspective view of the exemplary induction heating assembly of FIG. 15 with movable flux shields in a first configuration.
Figure 19:
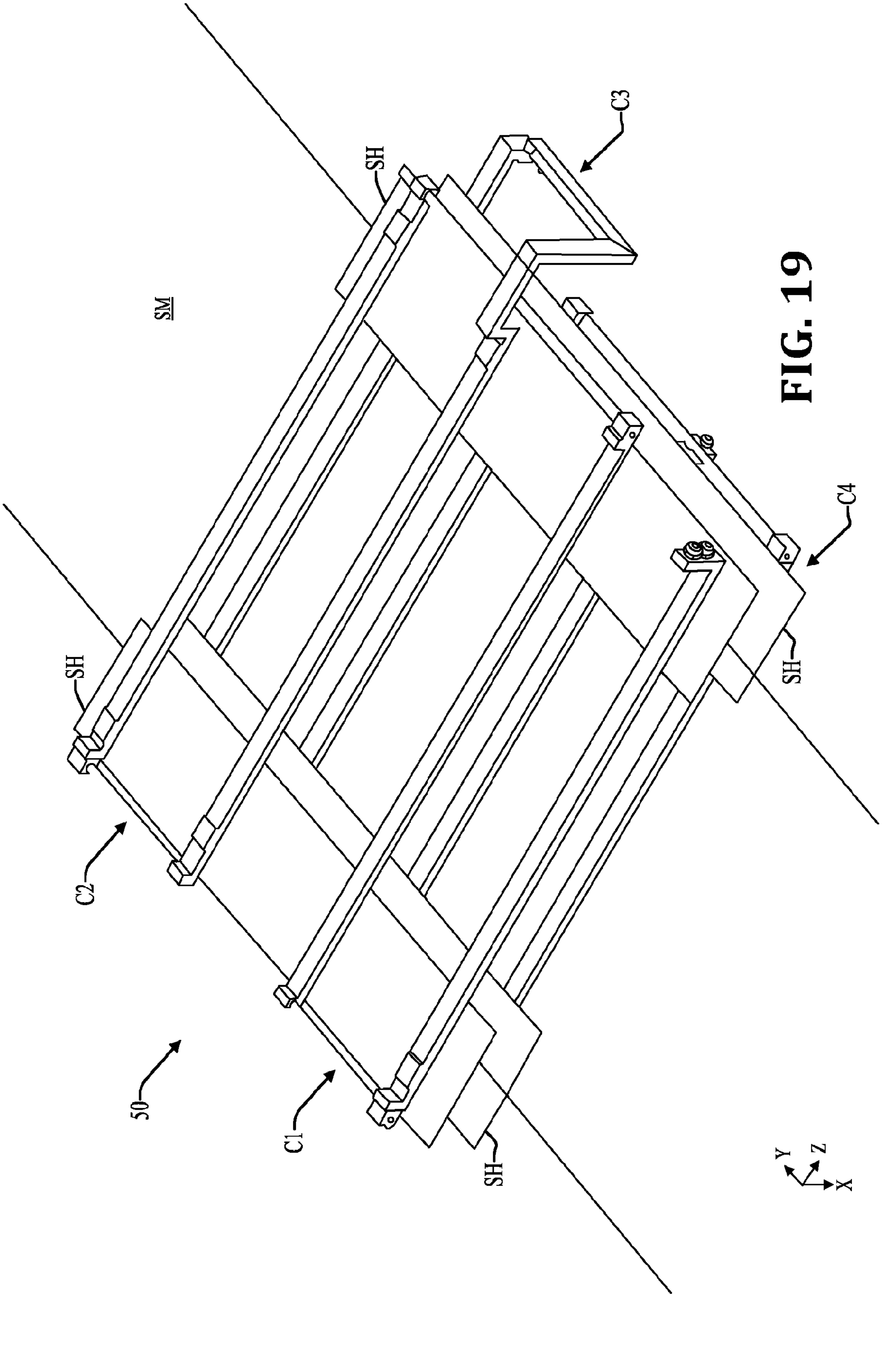
FIG. 19 is a perspective view of the exemplary induction heating assembly of FIG. 18 with movable flux shields in a second configuration.
Figure 20:
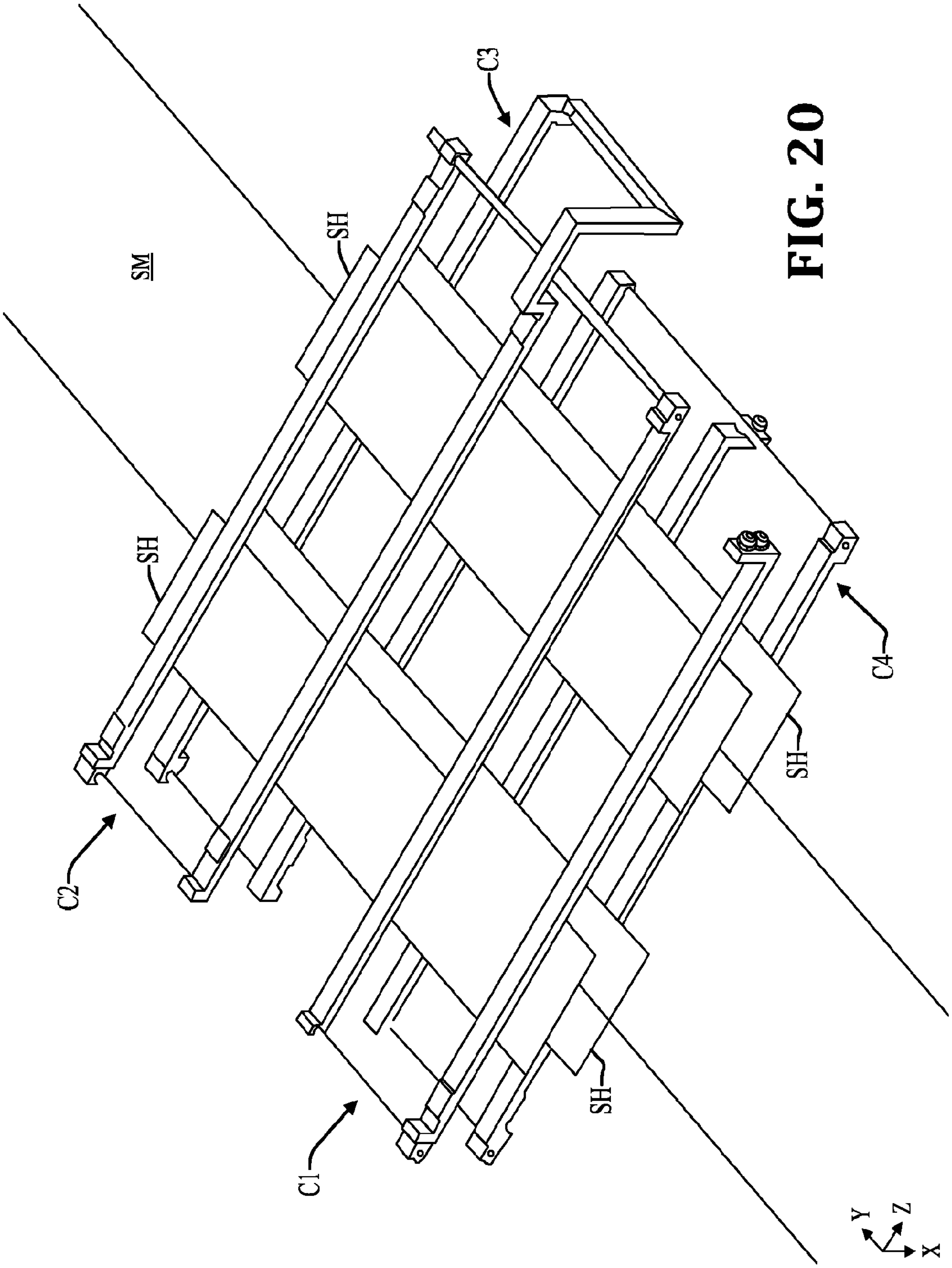
FIG. 20 is a perspective view of the exemplary induction heating assembly of FIG. 18 with movable flux shields in a third configuration about a narrow strip of sheet material.

Turning to FIGS. 18-20, the exemplary assembly 50 is illustrated with flux shields SH installed between the coils C1-C4 and the sheet material SM. The flux shield SH are generally aligned along the end rails and common rails and have a size and shape that generally is expected to longitudinal edge portions of the sheet material to prevent overheating of such edges. In FIGS. 18 and 19, a relatively wide strip of sheet material SM is illustrated, with the flux shields SH overlapping the sheet material SM a greater amount in FIG. 19 than in FIG. 18. In FIG. 20, a relatively narrow strip of sheet material SM is illustrated, and the flux shield SH have been moved inwardly to cover at least a portion of the longitudinal edges of the sheet material SM.

It should be appreciated that a wide range of actuators can be used to perform the adjustments described in the previous paragraphs, such as linear actuators, servos, etc. In some embodiments, some or all of the adjustments can be performed manually. In other embodiments, various sensors can be used to sense conditions of the sheet material and, in response to the sensed data, make real-time adjustments to one or more parameters of the assembly 50. For example, various thermal sensors can be used to monitor the temperature of the strip to identify hot or cool regions and adjust the assembly 50 to eliminate or reduce such regions. Edge tracking sensors can be used to locate the edges of the sheet material and position the flux shields more accurately with respect thereto.

Figure 21:
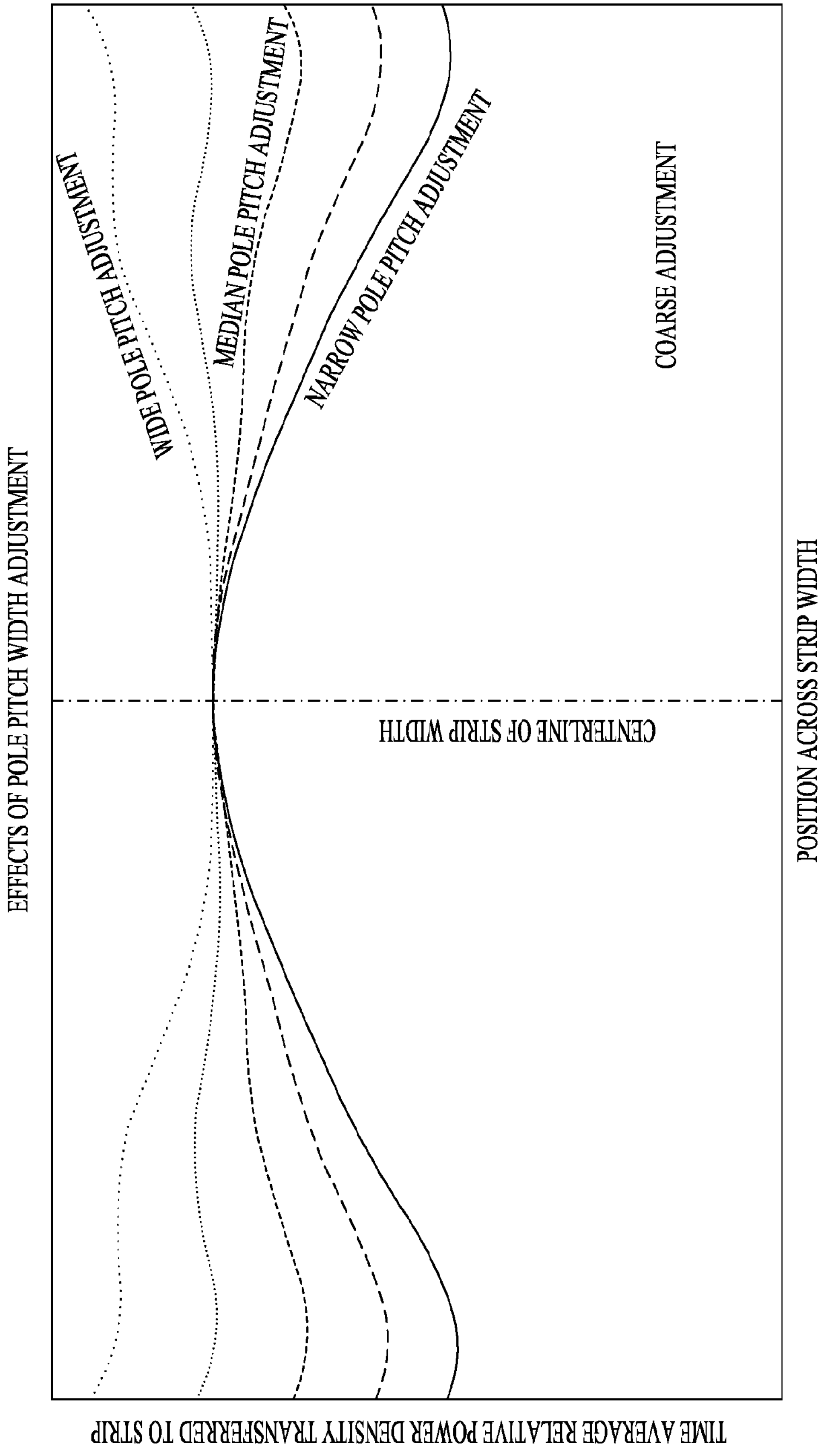
FIG. 21 is a graph illustrating the effects of pole pitch width adjustment.
Figure 22:
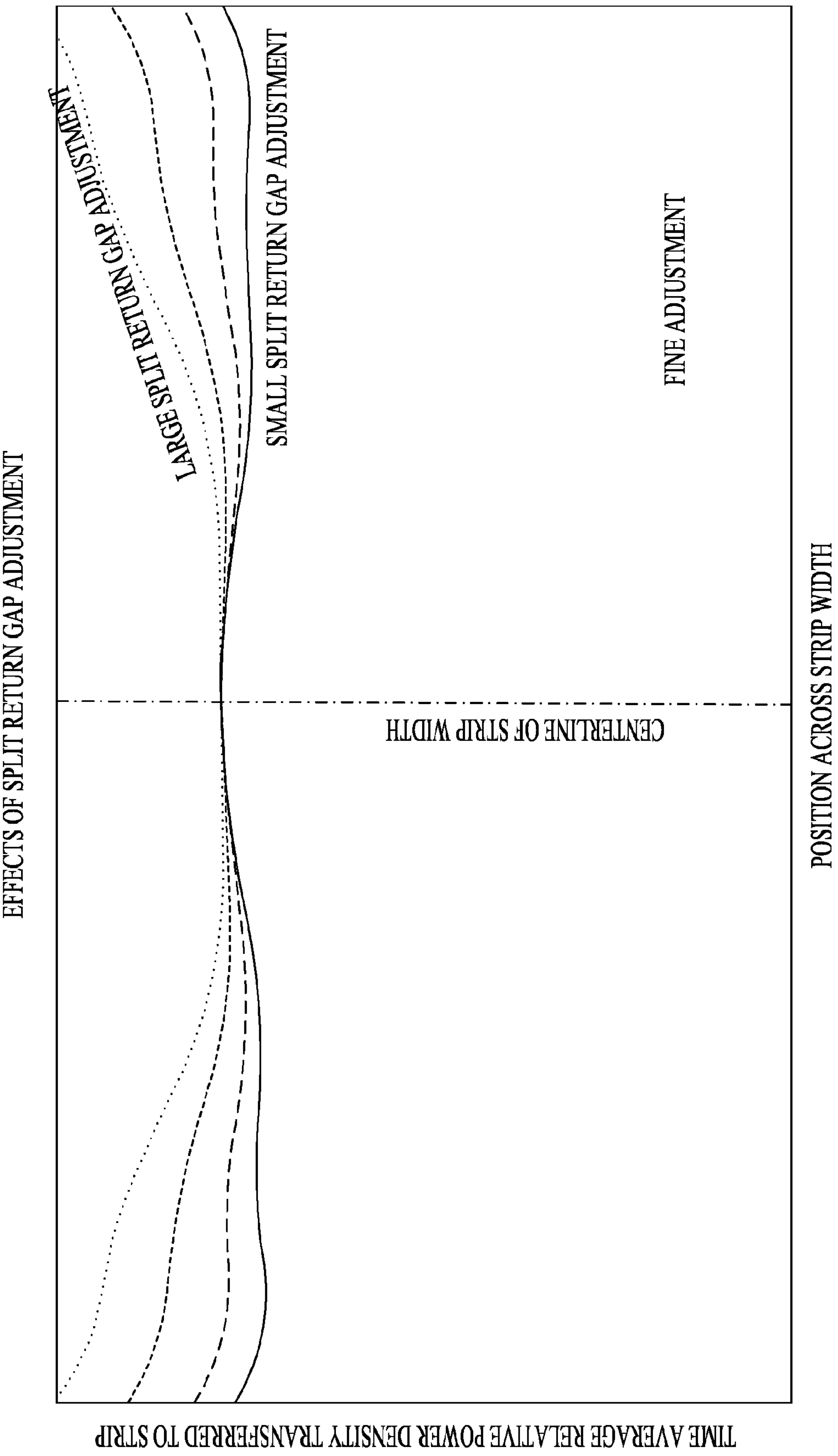
FIG. 22 is a graph illustrating the effects of split return gap adjustment.
Figure 23:
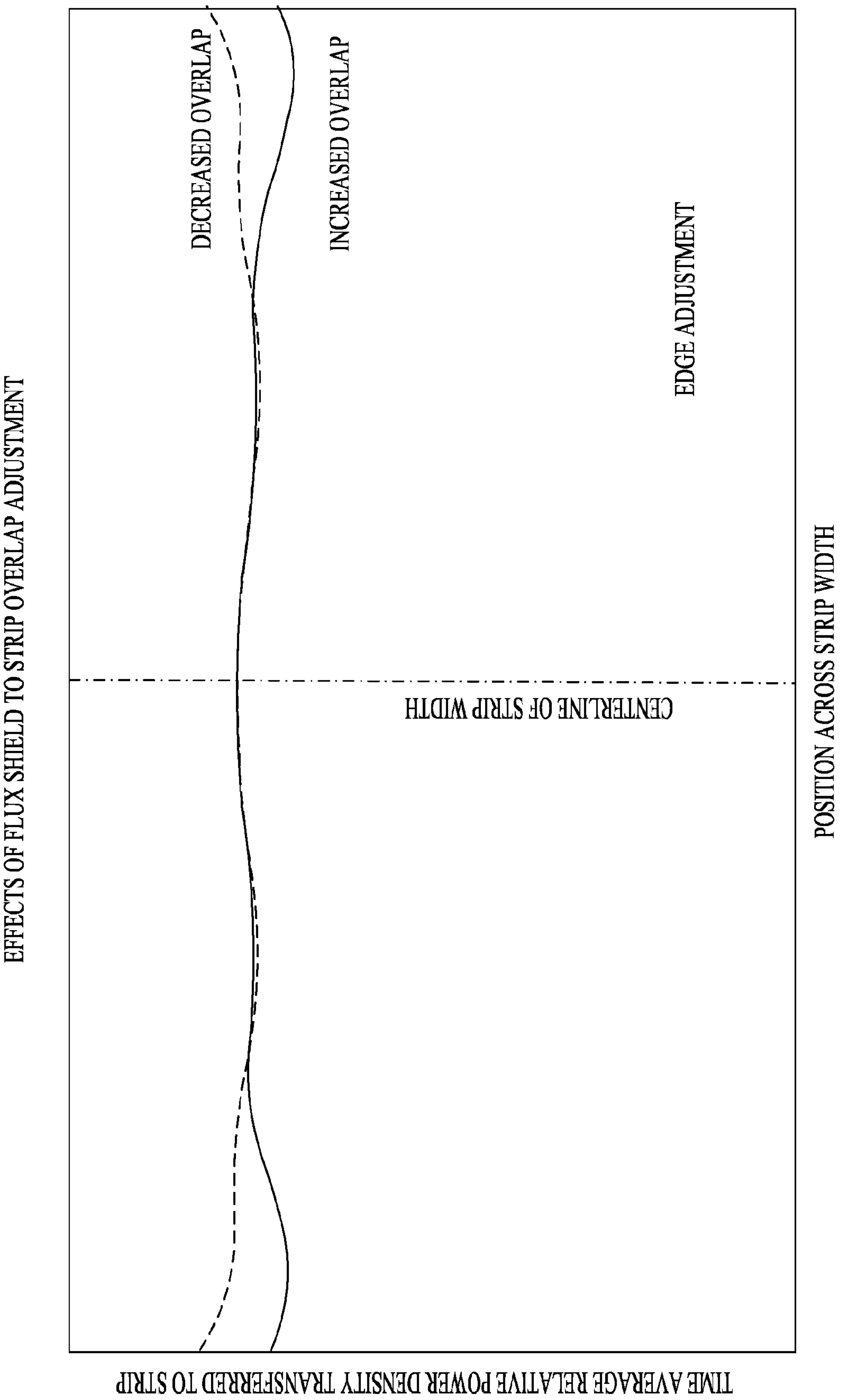
FIG. 23 is a graph illustrating the effects of flux shield overlap adjustment.

Turning to FIGS. 21-23, the effects of the above-described adjustments, pole pitch, split return gap, and shield position, are shown in graphical form for a strip of sheet material of a given width. In each graph, the position across the strip width is plotted on the x-axis, while the time average relative power density transferred to the strip is plotted along the y-axis. In FIG. 21, various pole pitches are graphed including a wide pole pitch (dotted line), median pole pitch (dashed line) and narrow pole pitch (solid line). As can be seen, each of the lines coincide at the centerline of the strip and diverge towards the edges of the strip, with the wide pole pitch resulting in the most power density transfer to edge portions and the narrow pole pitch resulting in the least power density transfer to edge portions. In FIG. 22, various split return gaps are graphed including a large split return gap (dotted line), and a small split return gap (solid line). As can be seen, each of the lines coincide at the centerline of the strip and diverge towards the edges of the strip, with the large split return gap resulting in the most power density transfer to edge portions and the small split return gap resulting in the least power density transfer to edge portions. It should be appreciated, that a change in pole pitch generally results in a larger overall change in power density transfer as compared to a change in split return gap.

Accordingly, adjustment of pole pitch width can be considered a coarse adjustment, while adjustment of split return gap can be considered a fine adjustment. Thus, in practice, the pole pitch may first be set to a width for achieving a baseline power density transfer, and then the split return gap can be used to fine tune the power density transfer.

FIG. 23 illustrates two different flux shield overlaps, a decreased overlap (dashed line) and an increased gap (solid line). The decreased overlap results in greater power density transfer at the edges of the strip. The overlap of the flux shields can be used in connection with the pole pitch and split return gap adjustments to fine tune the power density transfer for a given strip size.

Modifications are possible in the described examples, and other implementations are possible, within the scope of the claims.

What is claimed is:

1. A transverse flux induction coil assembly for induction heating at least a portion of an associated flat workpiece traveling along a process direction relative to the transverse flux electric induction coil assembly, the associated workpiece having opposite first and second workpiece sides and first and second workpiece edges, the induction heating apparatus comprising:

a first planar coil and a second planar coil arranged in a first common plane spaced from and facing the first workpiece side and extending between the first and second workpiece edges and electrically coupled in series;

wherein the first planar coil and the second planar coil are co-planarly spaced apart and at least one of the first planar coil and second planar coil is movable within the first common plane to change the spacing therebetween;

wherein the first planar coil has a first outgoing leg and a first return leg within the first common plane;

wherein the second planar coil has a second outgoing leg and a second return leg within the first common plane;

wherein a first one of the first outgoing leg and the first return leg is a first center leg that is closest to the second planar coil;

wherein a first one of the second outgoing leg and the second return leg is a second center leg that is closest to the first planar coil; and the first and second center legs are configured to conduct current in the same direction.

2. The transverse flux induction coil assembly of claim 1, wherein at least one of the first planar coil and the second planar coil is adjustable to change a pitch of the coil.

3. The transverse flux induction coil assembly of claim 2, wherein the first outgoing leg and the first return leg extend in a common direction and in spaced apart relation, the first outgoing leg and first return leg physically and electrically coupled to a first end rail, at least one of the first outgoing leg and the first return leg movably mounted to the first end rail such that the first outgoing leg and first return leg are movable towards and away from each other to change a coil pitch of the first planar coil; and wherein the second outgoing leg and the second return leg extend in a common direction and in spaced apart relation, the second outgoing leg and second return leg coupled to a second end rail, at least one of the second outgoing leg and the second return leg movably mounted to the second end rail such that the second outgoing leg and second return leg are movable towards and away from each other to change a coil pitch of the second planar coil.

4. The transverse flux induction coil assembly of claim 3, wherein the first planar coil and the second planar coil are each coupled to a first common rail, at least one of the first coil or second coil movably supported on the first common rail for movement towards or away from the other of the first or second coil.

5. The transverse flux induction coil assembly of claim 4, wherein the first return leg of the first coil and the second outgoing leg of the second coil are coupled to the first common rail, at least one of the first return leg and second outgoing leg movable relative to the common rail to change a distance between the first planar coil and the second planar coil.

6. The transverse flux induction coil assembly of claim 5, further comprising a third planar coil and a fourth planar coil arranged in a second common plane spaced from and facing the second workpiece side and extending between the first and second workpiece edges and electrically coupled in series with the first planar coil and the second planar coil.

7. The transverse flux induction coil assembly of claim 6, wherein the third planar coil and the fourth planar coil are co-planarly spaced apart in the second common plane and at least one of the third planar coil and fourth planar coil is movable within the second common plane to change the spacing therebetween.

8. The transverse flux induction coil assembly of claim 7, wherein at least one of the third planar coil and the fourth planar coil is adjustable to change a pitch of the coil.

9. The transverse flux induction coil assembly of claim 8, wherein the third planar coil is formed from a third outgoing leg and a third return leg extending in a common direction and in spaced apart relation, the third outgoing leg and third return leg physically and electrically coupled to a third end rail, at least one of the third outgoing leg and the third return leg movably mounted to the third end rail such that the third outgoing leg and third return leg are movable towards and away from each other to change a coil pitch of the third planar coil;

wherein the fourth planar coil is formed from a fourth outgoing leg and a fourth return leg extending in a common direction and in spaced apart relation, the fourth outgoing leg and fourth return leg coupled to an fourth end rail, at least one of the fourth outgoing leg and the fourth return leg movably mounted to the fourth end rail such that the fourth outgoing leg and fourth return leg are movable towards and away from each other to change a coil pitch of the fourth planar coil.

10. The transverse flux induction coil assembly of claim 9, wherein the third planar coil and the fourth planar coil are each coupled to a second common rail, at least one of the third planar coil or fourth planar coil movably supported on the second common rail for movement towards or away from the other of the third or fourth planar coil.

11. The transverse flux induction coil assembly of claim 10, wherein the third return leg of the third coil and the fourth outgoing leg of the fourth coil are coupled to the second common rail, at least one of the third return leg and fourth outgoing leg movable relative to the second common rail to change a distance between the third planar coil and the fourth planar coil.

12. The transverse flux induction coil assembly of claim 11, wherein the return leg of the second planar coil and the outgoing leg of the third planar coil are rigidly coupled together.

13. The transverse flux induction coil assembly of claim 1, further comprising at least one flux shield spaced from and disposed between the first common plane and the first workpiece side facing at least one of the first and second workpiece edges, wherein the at least one flux shield is movable in a transverse direction of the associated workpiece.

14. The transverse flux induction coil assembly of claim 1 wherein changing the spacing between the first planar coil and the second planar coil comprises changing spacing in the first common plane between the first center leg and the second center leg.

15. The transverse flux induction coil assembly of claim 1 further comprising at least one flux shield spaced from and disposed between the first common plane and the first workpiece side facing at least one of the first and second workpiece edges.

16. A transverse flux induction coil assembly for induction heating at least a portion of an associated flat workpiece traveling along a process direction relative to the transverse flux electric induction coil assembly, the associated workpiece having opposite first and second workpiece sides and first and second workpiece edges, the induction heating apparatus comprising:

a first planar coil and a second planar coil arranged in a first common plane spaced from and facing the first workpiece side and extending between the first and second workpiece edges and electrically coupled in series;

wherein at least one of the first planar coil and the second planar coil is adjustable to change a pitch of the coil;

wherein the first planar coil has a first outgoing leg and a first return leg within the common plane;

wherein the second planar coil has a second outgoing leg and a second return leg within the common plane;

wherein a first one of the first outgoing leg and the first return leg is a first center leg that is closest to the second planar coil;

wherein a first one of the second outgoing leg and the second return leg is a second center leg that is closest to the first planar coil; and the first and second center legs are configured to conduct current in the same direction; and, at least one flux shield spaced from and disposed between the first common plane and the first workpiece side facing at least one of the first and second workpiece edges, wherein the at least one flux shield is movable in a transverse direction of the associated workpiece.

17. The transverse flux induction coil assembly of claim 16, wherein the first planar coil is formed from a first outgoing leg and a first return leg extending in a common direction and in spaced apart relation, the first outgoing leg and first return leg physically and electrically coupled to a first end rail, at least one of the first outgoing leg and the first return leg movably mounted to the first end rail such that the first outgoing leg and first return leg are movable towards and away from each other to change a coil pitch of the first planar coil; and wherein the second planar coil is formed from a second outgoing leg and a second return leg extending in a common direction and in spaced apart relation, the second outgoing leg and second return leg coupled to an second end rail, at least one of the second outgoing leg and the second return leg movably mounted to the second end rail such that the second outgoing leg and second return leg are movable towards and away from each other to change a coil pitch of the second planar coil.

18. The transverse flux induction coil assembly of claim 17, further comprising a third planar coil and a fourth planar coil arranged in a second common plane spaced from and facing the second workpiece side and extending between the first and second workpiece edges and electrically coupled in series with the first planar coil and the second planar coil.

19. The transverse flux induction coil assembly of claim 18, wherein at least one of the third planar coil and the fourth planar coil is adjustable to change a pitch of the coil.

20. The transverse flux induction coil assembly of claim 19, wherein the third planar coil is formed from a third outgoing leg and a third return leg extending in a common direction and in spaced apart relation, the third outgoing leg and third return leg physically and electrically coupled to a third end rail, at least one of the third outgoing leg and the third return leg movably mounted to the third end rail such that the third outgoing leg and third return leg are movable towards and away from each other to change a coil pitch of the third planar coil;

wherein the fourth planar coil is formed from a fourth outgoing leg and a fourth return leg extending in a common direction and in spaced apart relation, the fourth outgoing leg and fourth return leg coupled to an fourth end rail, at least one of the fourth outgoing leg and the fourth return leg movably mounted to the fourth end rail such that the fourth outgoing leg and fourth return leg are movable towards and away from each other to change a coil pitch of the fourth planar coil.

21. The transverse flux induction coil assembly of claim 16 wherein the first planar coil and the second planar coil are co-planarly spaced apart and at least one of the first planar coil and second planar coil is movable within the first common plane to change the spacing therebetween.

22. The transverse flux induction coil assembly of claim 21 wherein changing the spacing between the first planar coil and the second planar coil comprises changing spacing in the first common plane between the first center leg and the second center leg.

23. A method of inductively heating an associated strip workpiece comprising:

supplying current to a transverse flux electric induction coil assembly for induction heating at least a portion of the associated strip workpiece traveling along a process direction relative to the transverse flux electric induction coil assembly, the associated workpiece having opposite first and second workpiece sides and first and second workpiece edges, the induction heating apparatus comprising:

a first planar coil and a second planar coil arranged in a first common plane spaced from and facing the first workpiece side and extending between the first and second workpiece edges and electrically coupled in series;

wherein the first planar coil and the second planar coil are co-planarly spaced apart and at least one of the first planar coil and second planar coil is movable within the common plane to change the spacing therebetween; and adjusting the spacing between the first and second coil;

wherein the first planar coil has a first outgoing leg and a first return leg within the common plane;

wherein the second planar coil has a second outgoing leg and a second return leg within the common plane;

wherein a first one of the first outgoing leg and the first return leg is a first center leg that is closest to the second planar coil;

wherein a first one of the second outgoing leg and the second return leg is a second center leg that is closest to the first planar coil; and the first and second center legs are configured to conduct current in the same direction.

24. The method of claim 23, wherein at least one of the first planar coil and the second planar coil is adjustable to change a pitch of the coil, and further comprising adjusting the pitch of at least one of the coils.

* * * * *